United States Patent
Kim et al.

(10) Patent No.: US 12,046,058 B2
(45) Date of Patent: Jul. 23, 2024

(54) ELECTRONIC DEVICE FOR CONVERTING HANDWRITING TO TEXT AND METHOD THEREFOR

(71) Applicant: Samsung Electronics Co., Ltd., Suwon-si (KR)

(72) Inventors: Dohyeon Kim, Suwon-si (KR); Jinsu Shin, Suwon-si (KR); Donghyuk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 371 days.

(21) Appl. No.: 17/370,533

(22) Filed: Jul. 8, 2021

(65) Prior Publication Data

US 2022/0012409 A1    Jan. 13, 2022

(30) Foreign Application Priority Data

Jul. 8, 2020    (KR) .......................... 10-2020-0083957

(51) Int. Cl.
   *G06F 3/0488*    (2022.01)
   *G06F 40/166*    (2020.01)
   *G06F 40/279*    (2020.01)
   *G06V 30/148*    (2022.01)

(52) U.S. Cl.
   CPC .......... *G06V 30/153* (2022.01); *G06F 3/0488* (2013.01); *G06F 40/166* (2020.01); *G06F 40/279* (2020.01)

(58) Field of Classification Search
   None
   See application file for complete search history.

(56) References Cited

U.S. PATENT DOCUMENTS

| | | |
|---|---|---|
| 5,613,019 A | 3/1997 | Altman et al. |
| 8,407,589 B2 | 3/2013 | Ye et al. |
| 9,317,492 B2 | 4/2016 | Ye et al. |
| 10,303,742 B2 | 5/2019 | Joshi |
| 2002/0009226 A1 | 1/2002 | Nakao et al. |

(Continued)

OTHER PUBLICATIONS

Liwicki et al., "On-Line Handwritten Text Line Detection Using Dynamic Programming," Ninth International Conference on Document Analysis and Recognition (ICDAR 2007), 5 pages. (Year: 2007).*

(Continued)

*Primary Examiner* — Amelia L Tapp
(74) *Attorney, Agent, or Firm* — Jefferson IP Law, LLP

(57) ABSTRACT

An electronic device is provided. The electronic device includes a display including a sensing panel that senses a handwriting input, at least one processor operatively connected to the display, and memory storing instructions that, when executed by the at least one processor, cause the electronic device to acquire the handwriting input through the display, wherein the handwriting input includes a first handwriting input corresponding to a first line and a second handwriting input corresponding to a second line, determine whether to merge the second line into the first line or to maintain the second line based on whether at least one of the first handwriting input and/or the second handwriting input satisfies a specified condition, convert the handwriting input where the merging or the maintenance of the second line is applied into text, and display the converted text through the display.

20 Claims, 20 Drawing Sheets

(56) References Cited

U.S. PATENT DOCUMENTS

| | | | |
|---|---|---|---|
| 2004/0165774 A1* | 8/2004 | Koubaroulis | G06V 30/333 |
| | | | 382/179 |
| 2005/0135678 A1* | 6/2005 | Wecker | G06F 3/04883 |
| | | | 382/186 |
| 2014/0119659 A1 | 5/2014 | Sugiura | |
| 2015/0058718 A1 | 2/2015 | Kim et al. | |
| 2016/0147723 A1 | 5/2016 | Lee et al. | |
| 2016/0154579 A1* | 6/2016 | Lee | G06F 3/04883 |
| | | | 382/189 |
| 2016/0179764 A1 | 6/2016 | Kelso et al. | |
| 2018/0349692 A1* | 12/2018 | Dixon | G06F 3/0412 |
| 2020/0081940 A1 | 3/2020 | Joshi | |
| 2020/0278789 A1 | 9/2020 | Kim et al. | |

OTHER PUBLICATIONS

International Search Report dated Oct. 22, 2021, issued in International Patent Application No. PCT/KR2021/008699.
Extended European Search Report dated Nov. 8, 2023, issued in European Application No. 21838497.2-1224.

* cited by examiner

ELECTRONIC DEVICE FOR CONVERTING HANDWRITING TO TEXT AND METHOD THEREFOR

CROSS-REFERENCE TO RELATED APPLICATION(S)

This application is based on and claims priority under 35 U.S.C. § 119(a) of a Korean patent application number 10-2020-0083957, filed on Jul. 8, 2020, in the Korean Intellectual Property Office, the disclosure of which is incorporated by reference herein in its entirety.

BACKGROUND

1. Field

The disclosure relates to a technology for converting handwriting to text.

2. Description of Related Art

An electronic device including a display such as a touch screen may acquire a handwriting input from a user through the display. The electronic device may display the recognized handwriting input on the display or convert the recognized handwriting input into text in a form (e.g., a font, a size, or a color) supported by the electronic device and display the converted text on the display. The electronic device may provide an environment in which the user may take notes freely using the electronic device by supporting a handwriting function.

The above information is presented as background information only to assist with an understanding of the disclosure. No determination has been made, and no assertion is made, as to whether any of the above might be applicable as prior art with regard to the disclosure.

SUMMARY

In a portable electronic device such as a smartphone or a tablet, a size of a display is limited, so that a space where a handwriting input may be acquired is also limited. For example, from a user's point of view, there may be situations in which a line needs to be changed because of lack of the space while inputting the handwriting. When the line-changed handwriting input is output as line-changed text, a sentence unintended by the user is generated, and consequently, utilization of a handwriting function may be reduced.

Aspects of the disclosure are to address at least the above-mentioned problems and/or disadvantages and to provide at least the advantages described below. Accordingly, an aspect of the disclosure is to provide an electronic device including a display including a sensing panel that senses a handwriting input, at least one processor operatively connected to the display, and memory storing instructions that, when executed by the at least one processor, cause the electronic device to acquire the handwriting input through the display, wherein the handwriting input includes a first handwriting input corresponding to a first line and a second handwriting input corresponding to a second line, determine whether to merge the second line into the first line or to maintain the second line based on whether at least one of the first handwriting input and/or the second handwriting input satisfies a specified condition, convert the handwriting input where the merging or the maintenance of the second line is applied into text, and display the converted text through the display.

Additional aspects will be set forth in part in the description which follows and, in part, will be apparent from the description, or may be learned by practice of the presented embodiments.

In accordance with an aspect of the disclosure, a method of an electronic device is provided. The method includes acquiring a handwriting input including a first handwriting input corresponding to a first line and a second handwriting input corresponding to a second line, determining whether to merge the second line into the first line or to maintain the second line based on whether at least one of the first handwriting input and/or the second handwriting input satisfies a specified condition, converting the handwriting input where the merging or the maintenance of the second line is applied into text, and outputting the converted text.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
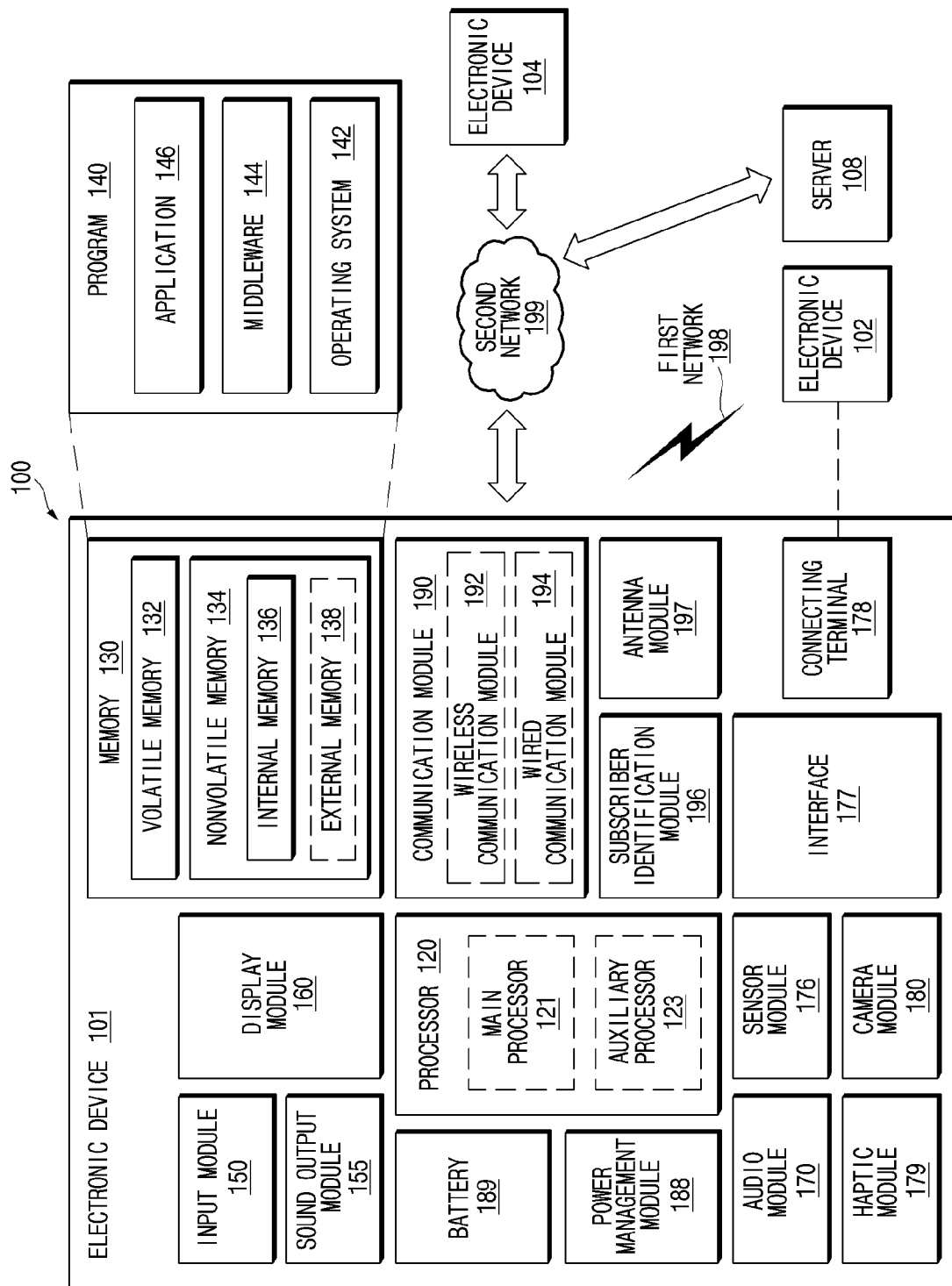
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment, the electronic device 101 may communicate with the external electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

The connecting terminal 178 may include a connector via which the electronic device 101 may be physically connected with the external electronic device (e.g., the external electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102 and 104 or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
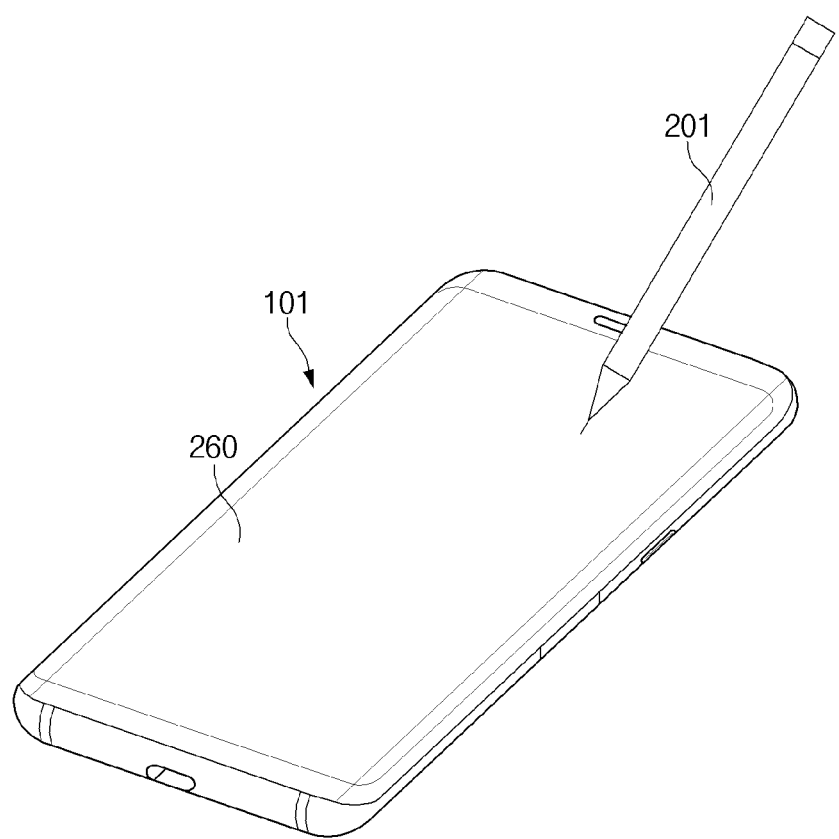
FIG. 2 shows an electronic device capable of acquiring a handwriting input according to an embodiment of the disclosure.

FIG. 2 shows an electronic device capable of acquiring a handwriting input according to an embodiment of the disclosure.

Referring to FIG. 2, an electronic device (e.g., an electronic device 101 in FIG. 1) may be a portable electronic device such as a smart phone or a tablet. A display 260 (e.g., the display module 160 in FIG. 1) of the electronic device 101 may include a display panel (not shown) or a sensing panel (or a touch panel) (not shown) set to sense a touch input. The sensing panel (or the touch panel) may be placed on a pixel (or inside the pixel) of the display panel. The sensing panel may include, for example, at least one of a digitizer and/or a touch circuit.

According to one embodiment, the display 260 may be combined with or may be placed adjacent to some of a touch sensing circuit connected to the touch panel to sense the touch, a pressure sensor capable of measuring an intensity (a pressure) of the touch, and the digitizer that detects a magnetic field-type digital pen 201.

According to one embodiment, the display 260 may be formed as a liquid crystal display (LCD), an organic light emitted diode (OLED), an active matrix organic light emitted diode (AMOLED), or a flexible display.

According to one embodiment, the electronic device 101 may acquire a handwriting input by receiving the touch input on the display 260 from the magnetic field-type digital pen 201. Although FIG. 2 shows an embodiment in which the electronic device 101 acquires the handwriting input from the magnetic field-type digital pen 201, according to another embodiment, the electronic device 101 may acquire the handwriting input from a body part (e.g., a finger) of a user.

Figure 3:
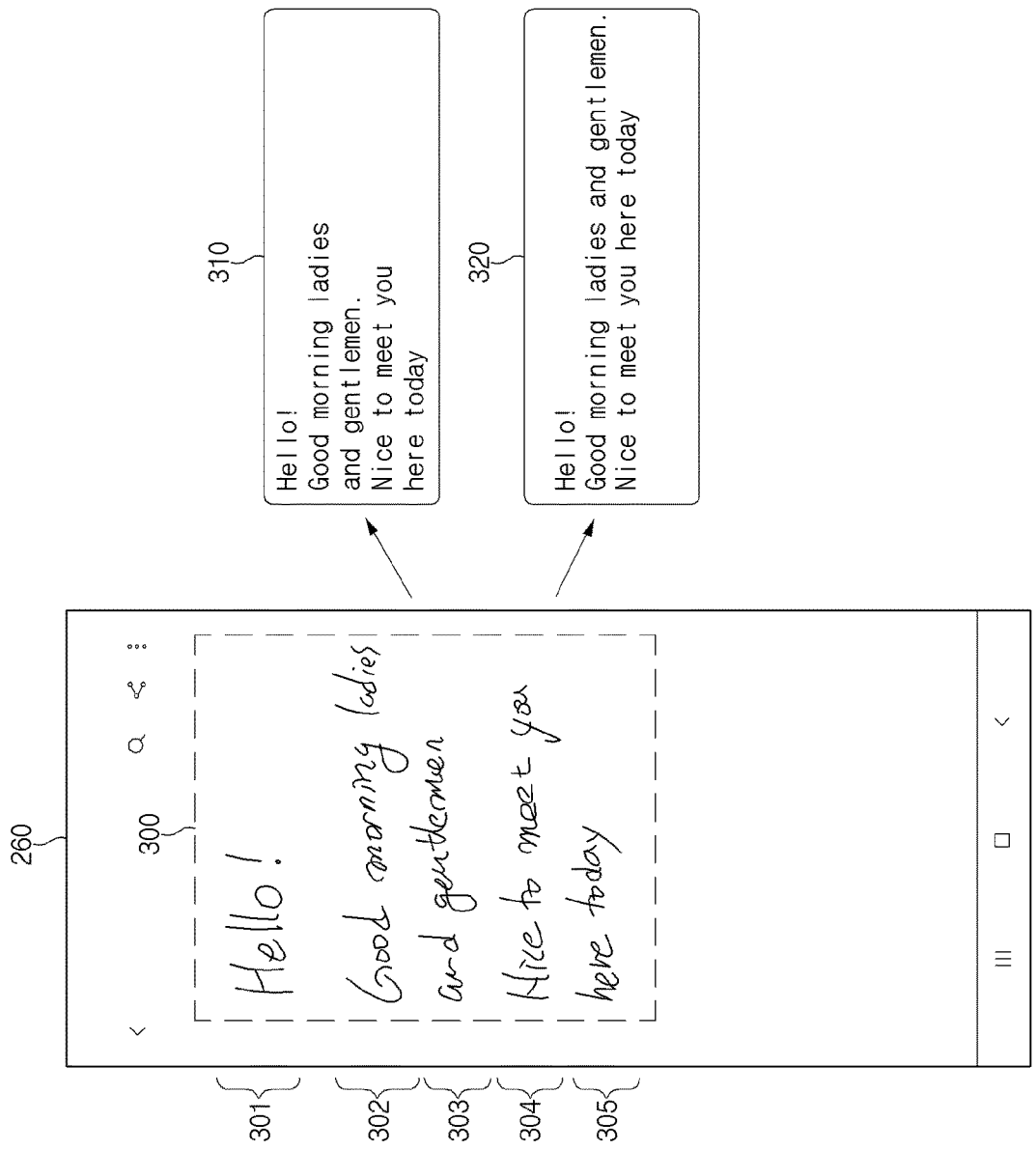
FIG. 3 shows a handwriting input and text according to an embodiment of the disclosure.

FIG. 3 shows a handwriting input and text according to an embodiment of the disclosure.

Referring to a left drawing of FIG. 3, an electronic device (e.g., an electronic device 101 in FIG. 1 or 2) may acquire a handwriting input 300 (e.g., 'Hello! Good morning ladies and gentlemen. Nice to meet you here today') on a region of the display 260. According to various embodiments disclosed in the disclosure, the region capable of acquiring the handwriting input 300 in the display 260 may be referred to as an 'input field'. The input field may be, for example, an entirety or a portion of the display 260. The electronic device 101 may provide the user with a user experience like writing with a pen by outputting the acquired (or recognized) handwriting input 300 on the input field in real time through the display 260.

According to one embodiment, when a letter or a sentence represented by the acquired handwriting input 300 needs to be shared with a user of another electronic device or edited as a document, the electronic device 101 may convert the acquired handwriting input 300 into text in a form (e.g., at least one of a font, a size, or a color) supported by the electronic device 101. For example, the electronic device 101 may convert the handwriting input 300 into text (e.g., first text 310 or second text 320) shown in a right drawing of FIG. 3, and output the converted text on the display 260.

Because a size of the display 260 is limited by characteristics of the electronic device 101 that requires portability, a situation in which the user of the electronic device 101 is not able to write the handwriting input 300 in one line may occur. For example, the acquired handwriting input 300 may include a plurality of lines 301, 302, 303, 304, and 305.

The electronic device 101 according to embodiments may convert the handwriting input 300 including the plurality of lines 301, 302, 303, 304, and 305 into the first text 310 including a plurality of lines through handwriting recognition. The first text 310 may not be in a form of a sentence desired by the user of the electronic device 101.

The electronic device 101 according to embodiments may merge or maintain at least some of the plurality of lines 301, 302, 303, 304, and 305 included in the acquired handwriting input 300 based on a specified condition, and convert the handwriting input 300 in which the lines are changed into the second text 320, thereby generating a sentence reflecting an intention of the user. For example, the electronic device 101 may merge some lines (e.g., line 302 and line 303, or line 304 and line 305) included in the handwriting input 300 into one line in the operation of converting the handwriting input 300 into the first text 310 or second text 320. As another example, the electronic device 101 may separate some lines (e.g., line 301) without merging with other lines in the operation of converting the handwriting input 300 into the first text 310 or the second text 320. A specific example in which the lines are merged or maintained based on the specified condition will be described with reference to FIGS. 6A, 6B, 7A, 7B, 8A, 8B, 9, 10A, 10B, 11A, 11B, 12A-12C, and 13.

Figure 4:
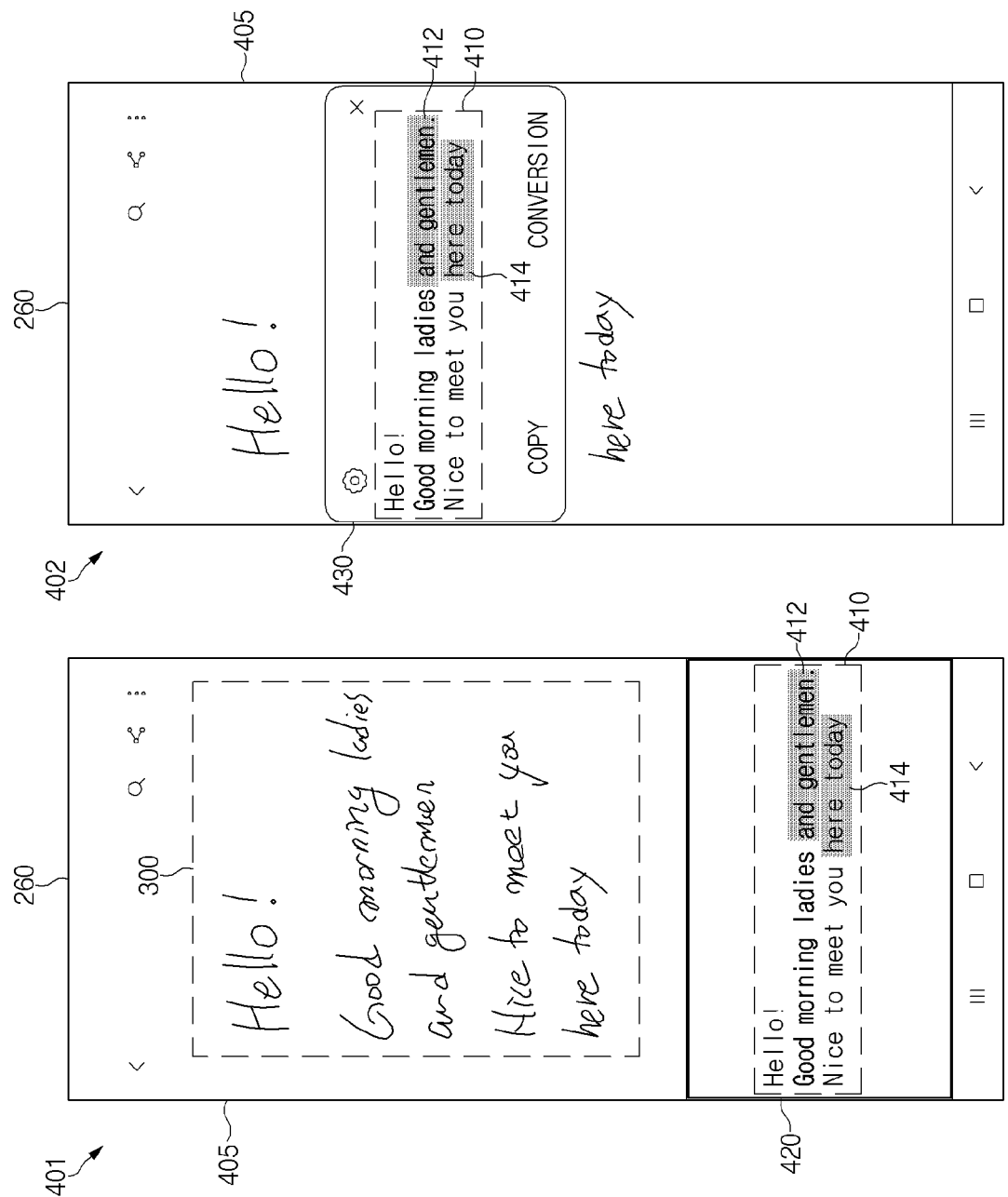
FIG. 4 shows a screen displaying a handwriting input and text according to an embodiment of the disclosure.

FIG. 4 shows a screen displaying a handwriting input and text according to an embodiment of the disclosure.

Referring to FIG. 4, an electronic device (e.g., an electronic device 101 in FIG. 1 or 2) may output text 410 (e.g., a second text 320 in FIG. 3) in which at least some of the plurality of lines included in a handwriting input 300 are merged or maintained through a display 260. For example, as shown in screen 401, the electronic device 101 may output an output field 420 including the text 410 on a region that does not overlap an input field 405. As another example, as shown in screen 402, the electronic device 101 may output a pop-up window 430 including the text 410 on a region at least partially overlapping the input field.

As shown in screen 402, the pop-up window 430 may include a visual object (e.g., a conversion button) for converting the handwriting input 300 into the text 410 or a visual object (e.g., a copy button) for copying the text 410.

In embodiments, the output field 420 or the pop-up window 430 may be output based on various conditions. For example, the electronic device 101 may output the output field 420 or the pop-up window 430 substantially simultaneously with the input field 405, output the output field 420 or the pop-up window 430 substantially simultaneously when sensing that the handwriting input is starting to be acquired on the input field 405, and output the output field 420 or the pop-up window 430 when a specified time elapses after the handwriting input starts to be acquired. As another example, the electronic device 101 may receive a user input requesting to convert the handwriting input 300 into the text 410, and output the output field 420 or the pop-up window 430 in response to the reception of the user input.

In embodiments, the electronic device 101 may provide a user interface (UI) such that the user may identify a portion in which the line is changed compared to the handwriting input 300 of the output text 410. For example, the electronic device 101 may shade text 412 or text 414 in which the lines are merged. Although not shown in FIG. 4, as another example, the electronic device 101 may output the text 412 or text 414 in which the lines are merged in a different color from other texts, or may output an indicator indicating that the lines are merged or maintained at a location adjacent to the text. The indicator may include, for example, a typesetting symbol such as a connecting line or an enter indication. In one embodiment, the electronic device 101 may return the merged or maintained lines to a previous state (that is, the same state as the handwriting input) in response to a user input of selecting the indicator. For example, contrary to an intention of the user, the electronic device 101 may merge a first line (e.g., 'Good morning ladies') and a second line (e.g., 'and gentlemen') and output the typesetting symbol such as the connecting line. In this case, when a user input of selecting the connecting line is received, the electronic device 101 may separate the first line and the second line from each other again.

Figure 5:
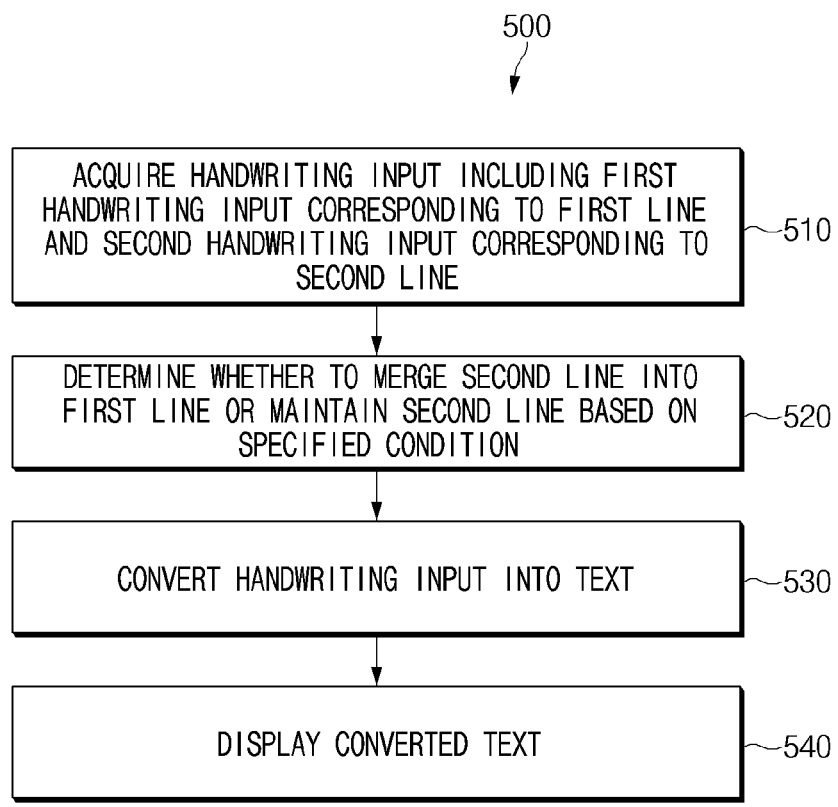
FIG. 5 shows an operational flowchart of an electronic device for converting a handwriting input into text according to an embodiment of the disclosure.

FIG. 5 shows an operational flowchart of an electronic device for converting a handwriting input into text according to an embodiment of the disclosure.

Operations included in operational flowchart 500 to be described below may be implemented by the electronic device 101 or may be implemented by components of the electronic device 101. For example, a processor (e.g., the processor 120 in FIG. 1) of the electronic device 101 may perform the operations for converting the handwriting input into the text by executing instructions stored in a memory (e.g., the memory 130 in FIG. 1).

Referring to FIG. 5, in operation 510, an electronic device 101 may acquire a handwriting input including a first handwriting input corresponding to the first line and a second handwriting input corresponding to the second line. The first line and the second line may be different lines. For example, the second line may mean a line below the first line.

In embodiments, the electronic device 101 may acquire the handwriting input through a touch circuit (e.g., a capacitive touch circuit or an electromagnetic induction-type touch circuit) included in a display (e.g., the display module 160 in FIG. 1 or the display 260 in FIG. 2).

In embodiments, the electronic device 101 may identify attributes of the handwriting input including a color, a thickness, and a brush type and may identify characteristics of the handwriting input including a letter size, a line, an alignment, a slope, and stroke characteristics (e.g., a slope at an end of a stroke).

In embodiments, the electronic device 101 may convert the handwriting input into the text based on the identified attributes and characteristics of the handwriting input. For example, the electronic device 101 may maintain or merge the lines of the text corresponding to the first line and the second line included in the handwriting input.

In operation 520, the electronic device 101 may determine whether to merge the second line into the first line or maintain the second line based on a specified condition. In one embodiment, the electronic device 101 may determine the merging or the maintenance of the line based on geometry information for the first handwriting input or the second handwriting input. The geometry information may include, for example, at least one of a size (e.g., a width or a height) of the recognized handwriting input, a width of a region occupied by the handwriting input on the input field, a start point of the handwriting input, an end point of the handwriting input, or a line spacing between the handwriting inputs. In another embodiment, the electronic device 101 may determine whether to merge or maintain the line based on a symbol or a number recognized in the first line or the second line. As another example, the electronic device 101 may determine whether to merge or maintain the line based on whether the acquired handwriting input represents a specified pattern. The specified pattern may indicate, for example, a phone number, a uniform resource locator (URL), or an e-mail address.

According to one embodiment, the electronic device 101 may consider the specified conditions independently, or may consider the specified conditions in combination. In this case, the electronic device 101 may set priorities for a plurality of specified conditions. The priorities may be determined, for example, based on a user setting or a frequency of use for the specified conditions.

In operation 530, the electronic device 101 may convert the handwriting input to which the line merging or maintenance is applied to the text.

According to one embodiment, the electronic device 101 may perform the text conversion operation when receiving a user input for converting the handwriting input into the text. In operation 540, the electronic device 101 may output the converted text through the display. In one embodiment, the electronic device 101 may display the converted text on the region that does not overlap with the acquired handwriting input or output the converted text as the pop-up window.

FIGS. 6A, 6B, 7A, 7B, 8A, 8B, 9, 10A, 10B, 11A, and 11B show embodiments for determining the merging or the maintenance of the line based on geometry information for the first handwriting input or the second handwriting input. The electronic device 101 may independently consider or combine the illustrated geometry information.

Figure 6A:
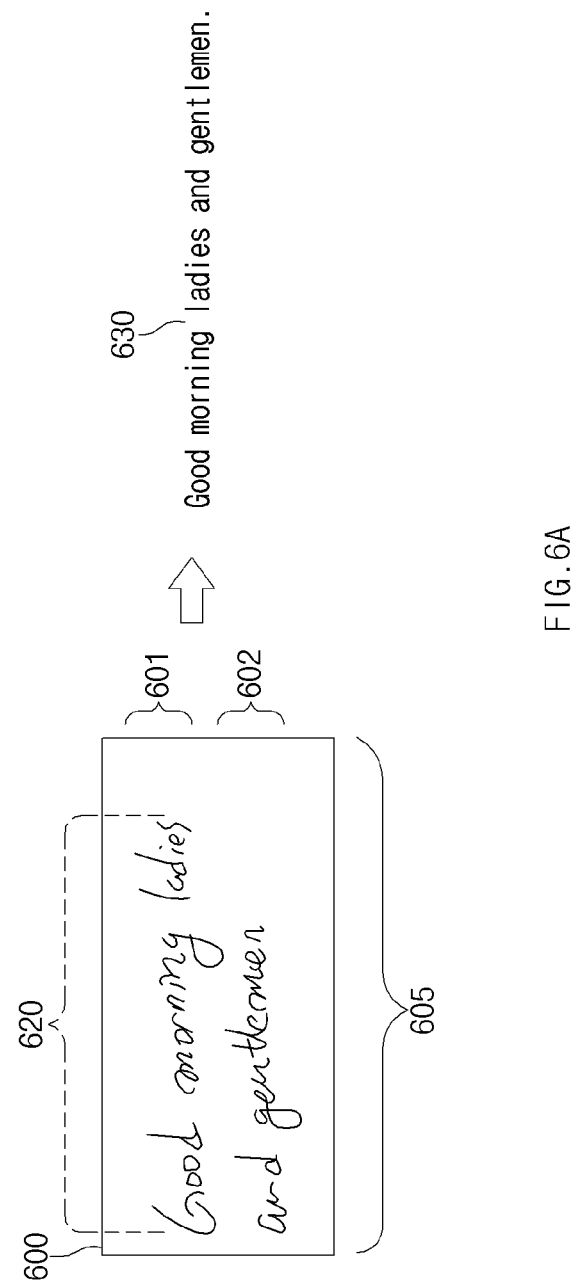
FIG. 6A illustrates an operation of converting a handwriting input into text based on a first condition according to an embodiment of the disclosure.

FIG. 6A illustrates an operation of converting a handwriting input into text based on a first condition according to an embodiment of the disclosure. In the disclosure, the first condition may be based on a width of a region occupied by the first handwriting input on the input field.

Referring to FIG. 6A, an electronic device 101 may acquire a handwriting input through a display 260. The acquired handwriting input may be output on an input field 600 (or a screen of the display). The handwriting input may include a first handwriting input (e.g., 'Good morning ladies') corresponding to a first line 601 and a second handwriting input (e.g., 'and gentlemen') corresponding to a second line 602.

In one embodiment, when a width 620 of a region occupied by the first handwriting input on the input field 600 is equal to or greater than a first threshold, the electronic device 101 may merge the second line 602 into the first line 601. In this case, the electronic device 101 may output text 630 to which the merging of the second line 602 is applied.

In one embodiment, the first threshold may be determined based on a specified ratio of a width 605 of the input field 600. For example, when the width 620 of the region occupied by the first handwriting input on the input field 600 is equal to or greater than about ⅔ of the width 605 of the input field 600, the electronic device 101 may merge the second line 602 into the first line 601. In another embodiment, the first threshold may be determined based on a specified ratio for at least one of a size of a display (e.g., the display 260 in FIG. 2) or a font size of the handwriting input. In another embodiment, the first threshold may be adjusted by a user setting.

Figure 6B:
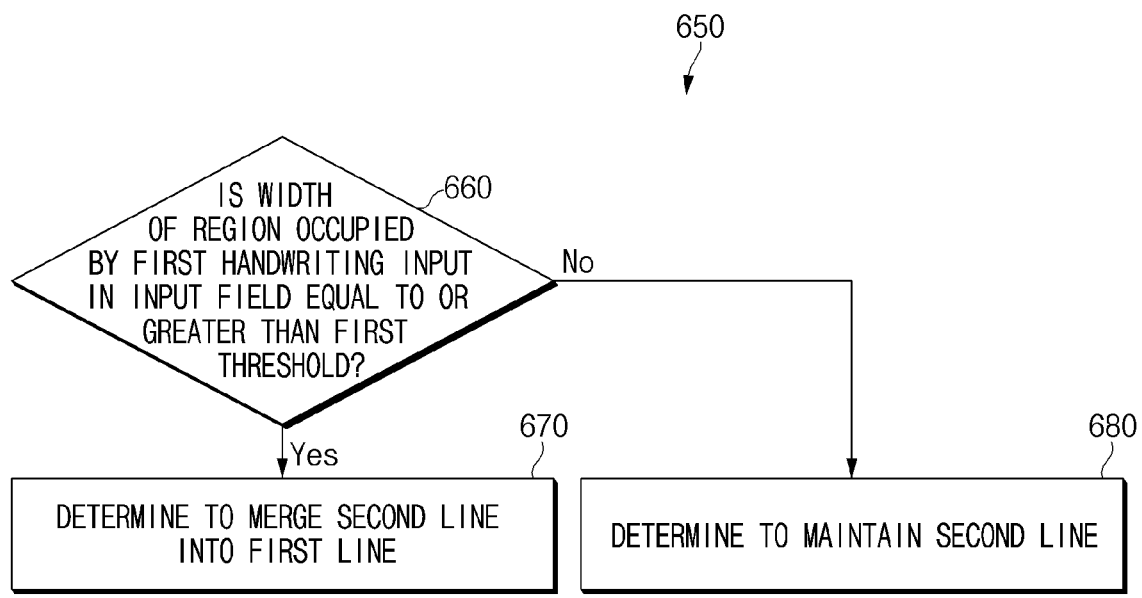
FIG. 6B illustrates an operational flowchart of an electronic device for converting a handwriting input into text based on a first condition according to an embodiment of the disclosure.

FIG. 6B illustrates an operational flowchart of an electronic device for converting a handwriting input into text based on a first condition according to an embodiment of the disclosure.

Referring to FIG. 6B, in operation 660 of operational flowchart 650, an electronic device 101 may determine whether a width 620 of the region occupied by the first handwriting input on an input field 600 is equal to or greater than the first threshold.

When the width of the region occupied by the first handwriting input on the input field is equal to or greater than the first threshold, in operation 670, the electronic device 101 may determine to merge the second line 602 into the first line 601.

When the width 620 of the region occupied by the first handwriting input on the input field 600 is less than the first threshold, in operation 680, the electronic device 101 may determine to maintain the second line 602 without merging. In this case, the text converted from the handwriting input may include a plurality of lines.

Figure 7A:
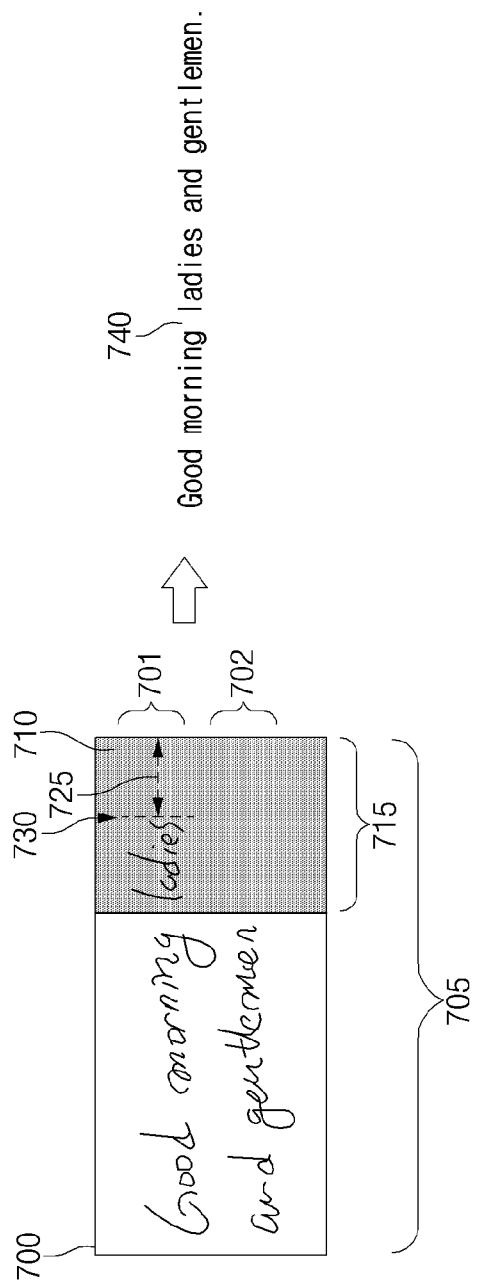
FIG. 7A illustrates an operation of converting a handwriting input into text based on a second condition according to an embodiment of the disclosure.

FIG. 7A illustrates an operation of converting a handwriting input into text based on a second condition according to an embodiment of the disclosure. In the disclosure, the second condition may be based on a location of an end point of a first handwriting input.

Referring to FIG. 7A, a handwriting input that is input on an input field 700 may include a first handwriting input corresponding to a first line 701 and a second handwriting input corresponding to a second line 702.

In one embodiment, when a distance 725 between an end point 730 of the first handwriting input and an end point of the input field is equal to or less than a second threshold, the electronic device 101 may merge the second line 702 into the first line 701. The electronic device 101 may output text 740 to which the merging of the second line 702 is applied. For convenience of description, FIG. 7A shows an example in which the end point 730 of the first handwriting input is displayed on the input field 700, but the end point 730 of the first handwriting input may not be output through the display.

In one embodiment, the second threshold may be determined based on a specified ratio of a width 705 of the input field 700. For example, when the distance 725 between the end point 730 of the first handwriting input and an end point of the input field is less than about ⅓ of the width 705 of the input field 700, the electronic device 101 may merge the second line 702 into the first line 701. In another embodiment, the second threshold may be determined based on a specified ratio for at least one of a size of a display (e.g., the display 260 in FIG. 2) or a font size of the handwriting input. In another embodiment, the second threshold may be adjusted by a user setting.

In another embodiment, when the end point 730 of the first handwriting input is located within a first region 710, the electronic device 101 may merge the second line 702 into the first line 701. The first region 710 may mean, for example, a region formed at one side (e.g., a right end) of the input field 700. A width 715 of the first region 710 may be determined based on a predetermined ratio (e.g., about ⅓ or about ¼) of the width 705 of the input field 700.

Figure 7B:
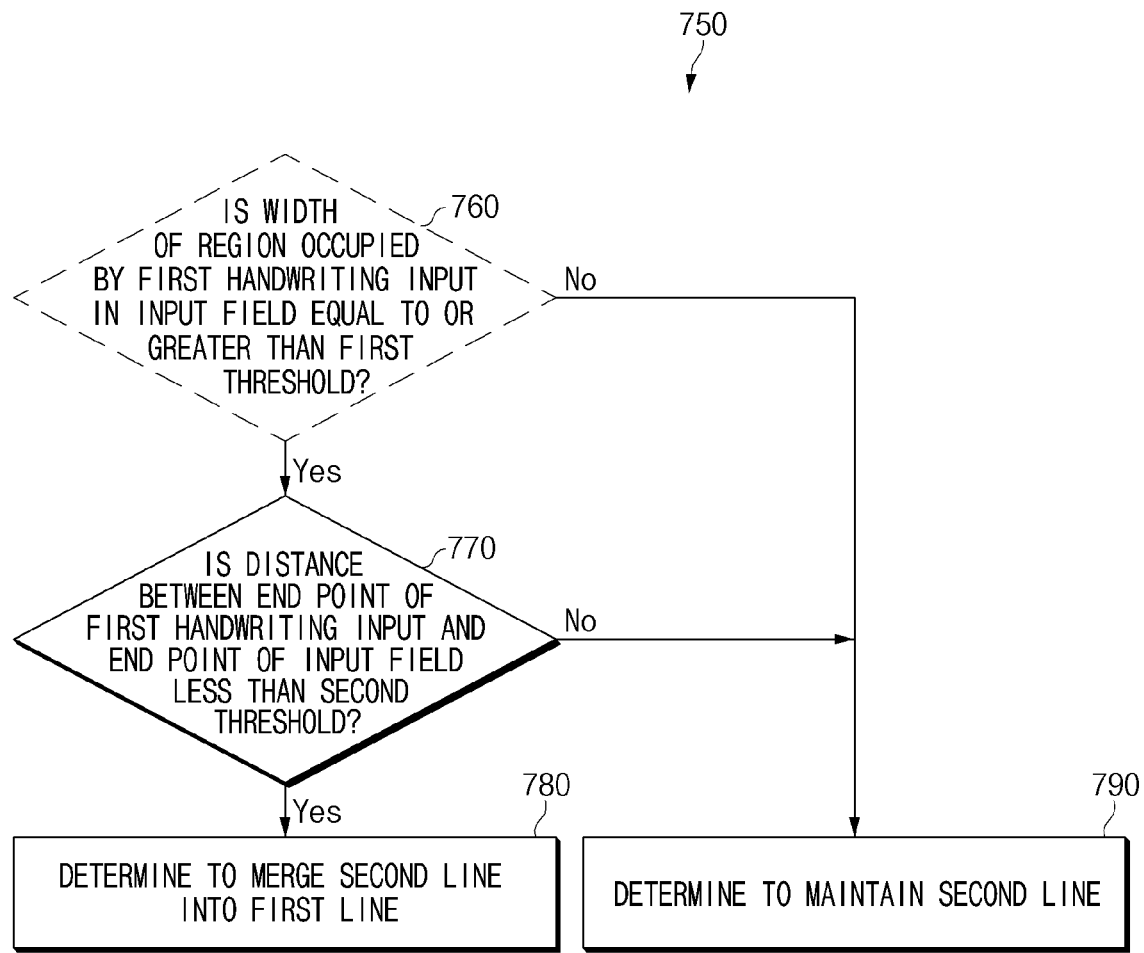
FIG. 7B illustrates an operational flowchart of an electronic device for converting a handwriting input into text based on a first condition and a second condition according to an embodiment of the disclosure.

FIG. 7B illustrates an operational flowchart of an electronic device for converting a handwriting input into text based on a first condition and a second condition according to an embodiment of the disclosure.

Referring to FIG. 7B, in operation 760 of operational flowchart 750, an electronic device 101 may determine whether the width (e.g., a width 620 in FIG. 6A) of the region occupied by the first handwriting input in an input field 700 is equal to or greater than the first threshold. The first threshold may be determined based on the specified ratio of the width of the input field 700.

When the width of the region occupied by the first handwriting input in the input field 700 is equal to or greater than the first threshold, the electronic device may perform operation 770. When the width of the region occupied by the first handwriting input in the input field 700 is less than the first threshold, in operation 790, the electronic device 101 may determine to maintain the second line 702 without merging.

In one embodiment, the electronic device 101 may directly perform operation 770 without performing operation 760.

In operation 770, the electronic device 101 may determine whether the distance 725 between the end point 730 of the first handwriting input and the end point of the input field is less than the second threshold. In another embodiment, the electronic device 101 may determine whether the end point 730 of the first handwriting input is located within the first region 710 formed at one side of the input field 700.

When the distance 725 between the end point 730 of the first handwriting input and the end point of the input field is less than the second threshold or when the end point 730 of the first handwriting input is located within the first region 710, in operation 780, the electronic device 101 may determine to merge the second line 702 into the first line 701.

When the distance 725 between the end point 730 of the first handwriting input and the end point of the input field exceeds the second threshold or when the end point 730 of the first handwriting input is not located within the first region 710, in operation 790, the electronic device 101 may determine to maintain the second line 702.

Figure 8A:
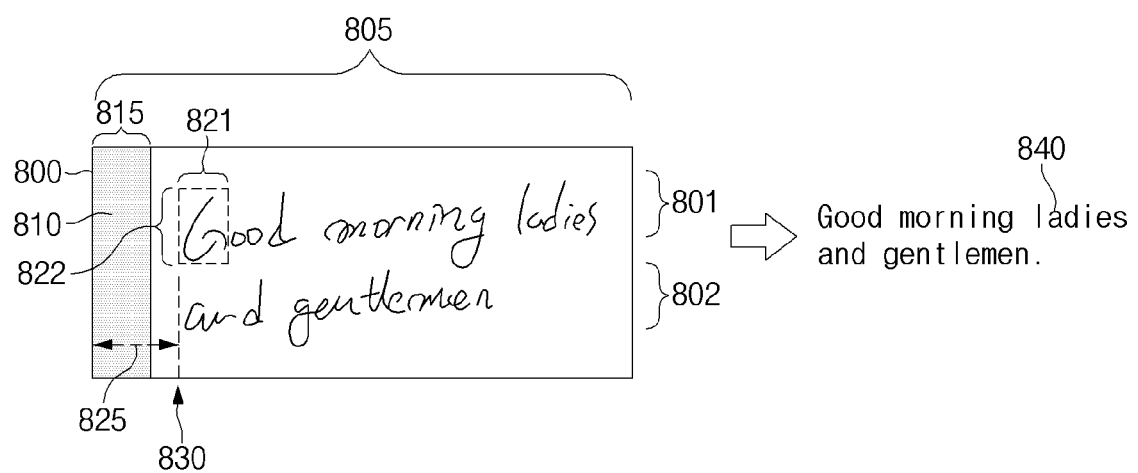
FIG. 8A illustrates an operation of converting a handwriting input into text based on a third condition according to an embodiment of the disclosure.

FIG. 8A illustrates an operation of converting a handwriting input into text based on a third condition according to an embodiment of the disclosure. In the disclosure, the third condition may be based on a location of a start point of the second handwriting input.

Referring to FIG. 8A, a handwriting input that is input on an input field 800 may include a first handwriting input corresponding to a first line 801 and a second handwriting input corresponding to a second line 802.

In one embodiment, when a distance 825 between a start point 830 of the second handwriting input and a start point of the input field exceeds a third threshold, the electronic device 101 may maintain the second line 802. In this case, the electronic device 101 may output text 840 in which the first line 801 and the second line 802 are separated from each other. Conversely, when the distance 825 between the start point 830 of the second handwriting input and the start point of the input field is less than the third threshold, the electronic device 101 may merge the second line 802 into the first line 801. For convenience of description, FIG. 8A shows an example in which the start point 830 of the second handwriting input is displayed on the input field 800, but the start point 830 of the second handwriting input may not be output through the display.

The third threshold may be determined based on a specified ratio of a width 805 of the input field 800. For example, when the distance 825 between the start point 830 of the second handwriting input and the start point of the input field exceeds ⅕ of the width 805 of the input field 800, the electronic device 101 may maintain the second line 802.

As another example, the third threshold may be determined based on a specified ratio of a size of a display (e.g., the display 260 in FIG. 2). As another example, the third threshold may be adjusted by a user setting.

As another example, the third threshold may be determined based on a size of a letter indicated by the acquired handwriting input. In the disclosure, the size of the letter may mean at least one of a height, a width, and/or an area (e.g., height x width) of the letter. For example, the electronic device 101 may determine a height 822, a width 821, or an area of one letter (e.g., 'G') included in the acquired handwriting input, and determine a specified multiple (e.g., 2 times) of the determined value as the third threshold. As another example, the electronic device 101 may calculate an intermediate value for sizes of a plurality of letters included in the acquired handwriting input, and determine a specified multiple (e.g., 2 times) of the calculated intermediate value as the third threshold. Depending on a handwriting scheme of the user, the sizes of the letters included in the handwriting input may be irregular, so that the electronic device 101 may more clearly reflect an intention of the user using the intermediate value instead of using an average value for the sizes of the plurality of letters.

In one embodiment, without being limited thereto, the electronic device 101 may determine the third threshold using at least one of a variance or a standard deviation value for a normalized distribution of the sizes of the plurality of letters included in the acquired handwriting input.

In another embodiment, the electronic device 101 may maintain the second line 802 when the start point 830 of the second handwriting input deviates from a second region 810. The second region 810 may mean, for example, a region formed at a side (e.g., a left end) of the input field 800 opposite to a first region (e.g., the first region 710 in FIG. 7A). A width 815 of the second region 810 may be determined based on a specified ratio (e.g., about ⅕ or about ¹⁄₁₀) of the width 805 of the input field 800.

Figure 8B:
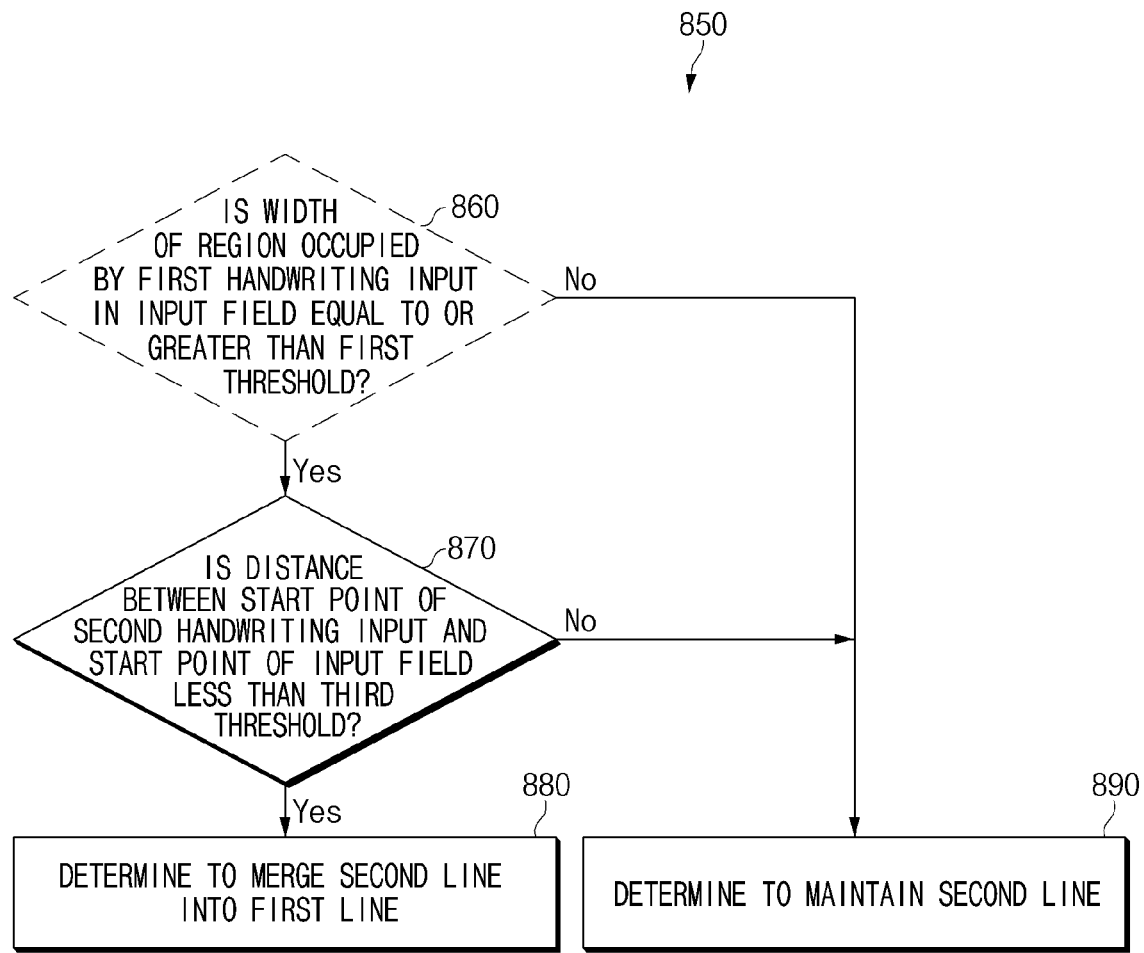
FIG. 8B illustrates an operational flowchart of an electronic device for converting a handwriting input into text based on a first condition and a third condition according to an embodiment of the disclosure.

FIG. 8B illustrates an operational flowchart of an electronic device for converting a handwriting input into text based on a first condition and a third condition according to an embodiment of the disclosure.

Referring to FIG. 8B, in operation 860 of operational flowchart 850, an electronic device 101 may determine whether a width (e.g., a width 620 in FIG. 6A) of a region occupied by the first handwriting input in an input field 800 is equal to or greater than the first threshold. The first threshold may be determined based on a specified ratio for a width of the input field 800.

When the width of the region occupied by the first handwriting input in the input field 800 is equal to or greater than the first threshold, the electronic device may perform operation 870. When the width of the region occupied by the first handwriting input in the input field 800 is less than the first threshold, in operation 890, the electronic device 101 may determine to maintain the second line 802.

In one embodiment, the electronic device 101 may directly perform operation 870 without performing operation 860.

In operation 870, the electronic device 101 may determine whether the distance 825 between the start point 830 of the second handwriting input and the start point of the input field is less than the third threshold. In another embodiment, the electronic device 101 may determine whether the start point 830 of the second handwriting input is located within the second region 810.

When the distance 825 between the start point 830 of the second handwriting input and the start point of the input field is less than the third threshold or when the start point 830 of the second handwriting input is located within the second region 810, in operation 880, the electronic device 101 may determine to merge the second line 802 into the first line 801.

When the distance 825 between the start point 830 of the second handwriting input and the start point of the input field exceeds the third threshold or when the start point 830 of the second handwriting input is not located within the second region 810, in operation 890, the electronic device 101 may determine to maintain the second line 802.

Figure 9:
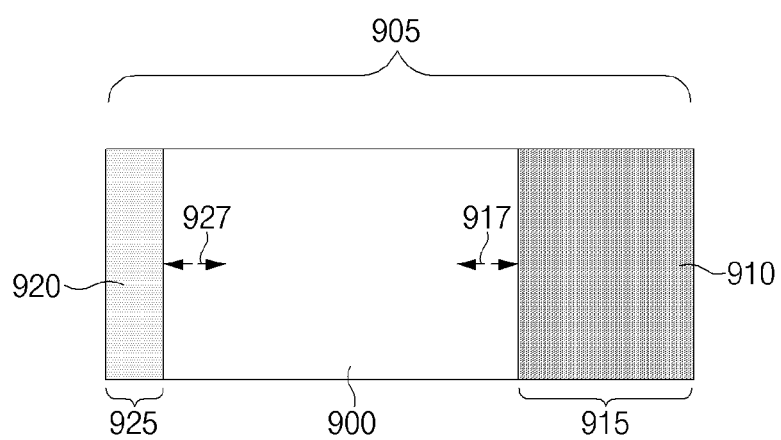
FIG. 9 shows a screen region used to merge or maintain a line of a handwriting input according to an embodiment of the disclosure.

FIG. 9 shows a screen region used to merge or maintain a line of a handwriting input according to an embodiment of the disclosure.

Referring to FIG. 9, a first region 910 (e.g., a first region 710 in FIG. 7A) may mean a location adjacent to an end point of a line in a region (e.g., an input field 900) where the handwriting input may be acquired. For example, the first region 910 may be located in a right region of the input field 900. A second region 920 (e.g., the second region 810 in FIG. 8A) may mean a location adjacent to a start point of the line in the region where the handwriting input may be acquired. For example, the second region 920 may be located in a left region of the input field 900.

A width 915 of the first region 910 or a width 925 of the second region 920 may be determined based on a specified ratio of a width 905 of the input field 900. For example, the width 915 of the first region 910 may be about ⅓ of the width 905 of the input field 900, and the width 925 of the second region 920 may be ⅕ of the width 905 of the input field 900.

In another embodiment, the width 915 of the first region 910 or the width 925 of the second region 920 may be determined based on a specified ratio for at least one of a size of the display 260 or a font size of the handwriting input.

In one embodiment, the electronic device 101 may use at least one of the first region 910 or the second region 920 to determine the merging or the maintenance of the line without outputting at least one of the first region 910 or the second region 920 on the display 260. In another embodiment, the electronic device 101 may display at least one of the first region 910 or the second region 920 such that the user of the electronic device 101 may know a criteria by which line merging or the maintenance of the line is determined. For example, the electronic device 101 may output the first region 910 or the second region 920 in the region of the input field 900 on the display 260 while distinguishing (e.g., shading) the first region 910 or the second region 920. In this case, the electronic device 101 change the width 915 of the first region 910 or the width 925 of the second region 920 by acquiring an input (e.g., a swipe input) of the user of moving the output first region 910 or second region 920 in a specified direction (e.g., direction 917 or direction 927).

Figure 10A:
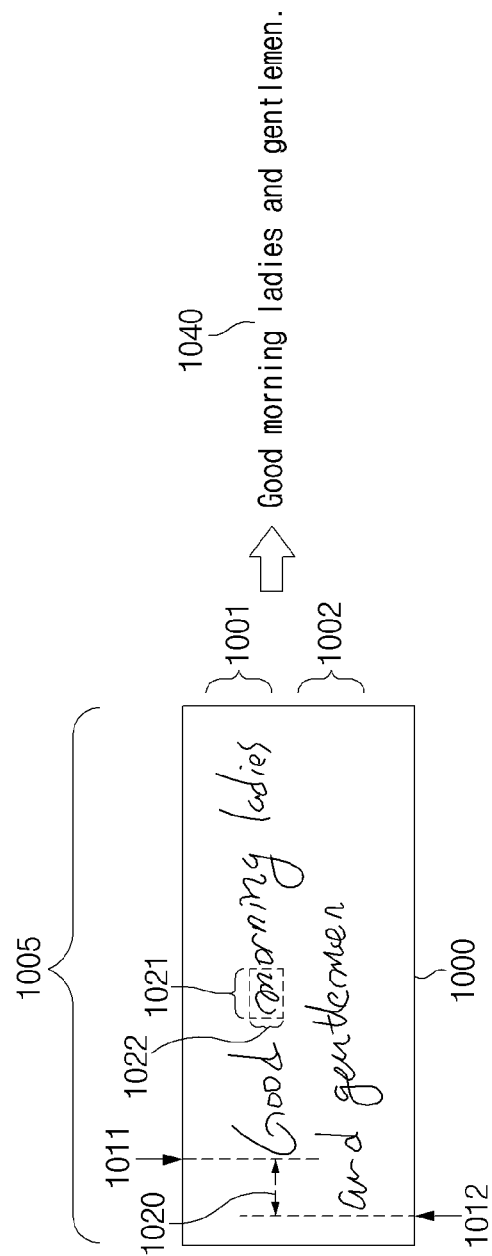
FIG. 10A illustrates an operation of converting a handwriting input into text based on a first condition and a fourth condition according to an embodiment of the disclosure.

FIG. 10A illustrates an operation of converting a handwriting input into text based on a first condition and a fourth condition according to an embodiment of the disclosure. In the disclosure, the fourth condition may be based on locations of a start point of a first handwriting input and a start point of a second handwriting input.

Referring to FIG. 10A, a handwriting input that is input on an input field 1000 may include a first handwriting input corresponding to a first line 1001 and a second handwriting input corresponding to a second line 1002.

In one embodiment, when a distance 1020 between a start point 1011 of the first handwriting input and a start point 1012 of the second handwriting input is less than a fourth threshold, the electronic device 101 may merge the second line 1002 into the first line 1001. In this case, the electronic device 101 may output text 1040 in which the second line 1002 is merged. For convenience of description, FIG. 10A shows an example in which the start point 1011 of the first handwriting input and the start point 1012 of the second handwriting input are displayed on the input field 1000, but the start point 1011 of the first handwriting input and the start point 1012 of the second handwriting input may not be output through the display.

The fourth threshold may be determined based on a specified ratio of a width 1005 of the input field 1000. For example, when the distance 1020 between the start point 1011 of the first handwriting input and the start point 1012 of the second handwriting input is less than about 1/10 of the width 1005 of the input field 1000, the electronic device 101 may merge the second line 1002.

As another example, the fourth threshold may be determined based on a specified ratio of a size of a display (e.g., the display 260 in FIG. 2). As another example, the fourth threshold may be adjusted by a user setting.

As another example, the fourth threshold may be determined based on a size of a letter included in the acquired handwriting input. For example, the electronic device 101 may determine at least one of a height 1022, a width 1021, or an area of one letter (e.g., 'm') included in the acquired handwriting input, and determine a specified multiple (e.g., 2 times) of the determined value as the fourth threshold. As another example, the electronic device 101 may calculate an intermediate value for sizes of a plurality of letters included in the acquired handwriting input, and determine a specified multiple (e.g., 2 times) of the calculated intermediate value as the fourth threshold.

Figure 10B:
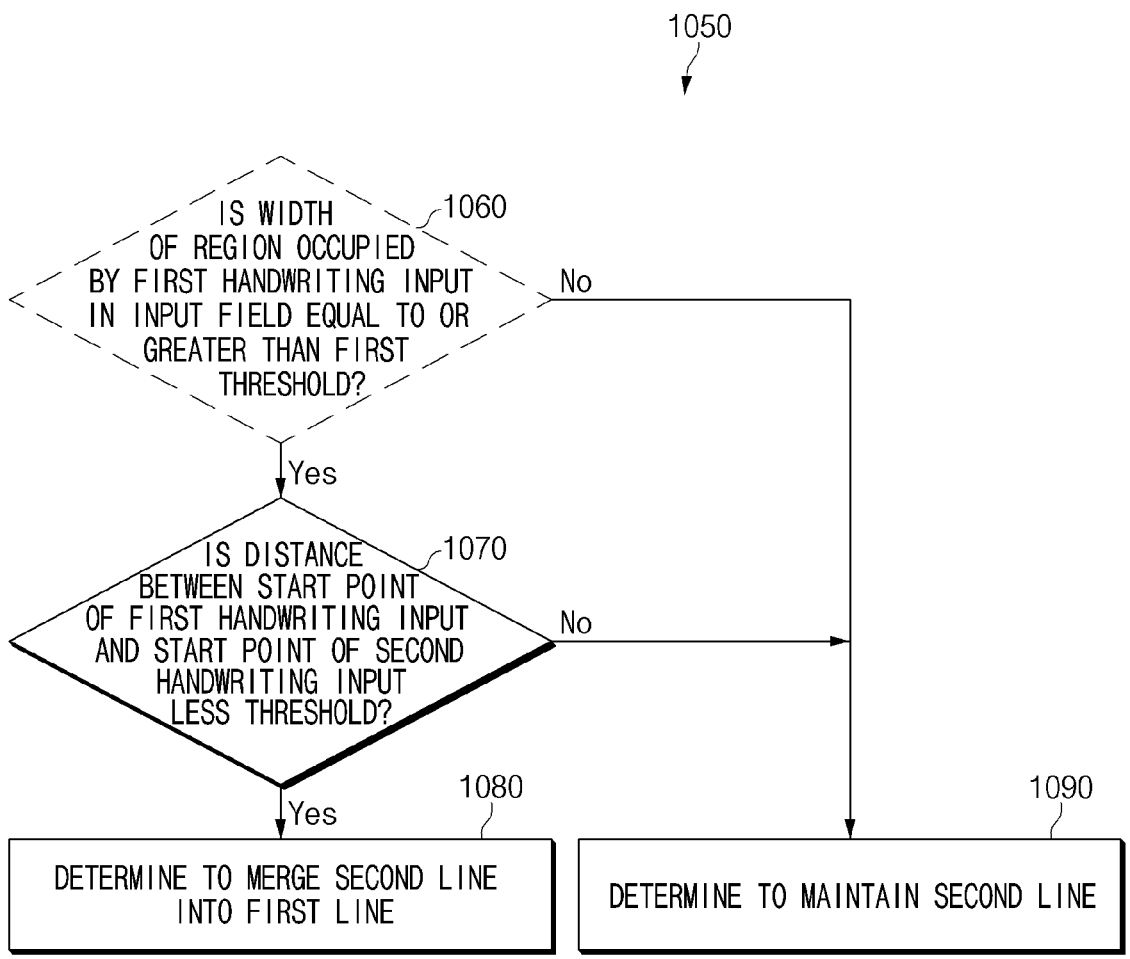
FIG. 10B illustrates an operational flowchart of an electronic device for converting a handwriting input into text based on a first condition and a fourth condition according to an embodiment of the disclosure.

FIG. 10B illustrates an operational flowchart of an electronic device for converting a handwriting input into text based on a first condition and a fourth condition according to an embodiment of the disclosure.

Referring to FIG. 10B, in operation 1060 of operational flowchart 1050, an electronic device 101 may determine whether a width (e.g., a width 620 in FIG. 6A) of a region occupied by a first handwriting input in an input field 1000 is equal to or greater than a first threshold. The first threshold may be determined based on a specified ratio of a width of the input field 1000.

When the width of the region occupied by the first handwriting input in the input field 1000 is equal to or greater than the first threshold, the electronic device may perform operation 1070. When the width of the region occupied by the first handwriting input in the input field 1000 is less than the first threshold, in operation 1090, the electronic device 101 may determine to maintain the second line 1002.

In one embodiment, the electronic device 101 may directly perform operation 1070 without performing operation 1060.

In operation 1070, the electronic device 101 may determine whether the distance 1020 between the start point 1011 of the first handwriting input and the start point 1012 of the second handwriting input is less than the fourth threshold.

When the distance 1020 between the start point 1011 of the first handwriting input and the start point 1012 of the second handwriting input is less than the fourth threshold, in operation 1080, the electronic device 101 may determine to merge the second line 1002 into the first line 1001.

When the distance 1020 between the start point 1011 of the first handwriting input and the start point 1012 of the second handwriting input exceeds the fourth threshold, in operation 1090, the electronic device 101 may determine to maintain the second line 1002.

Figure 11A:
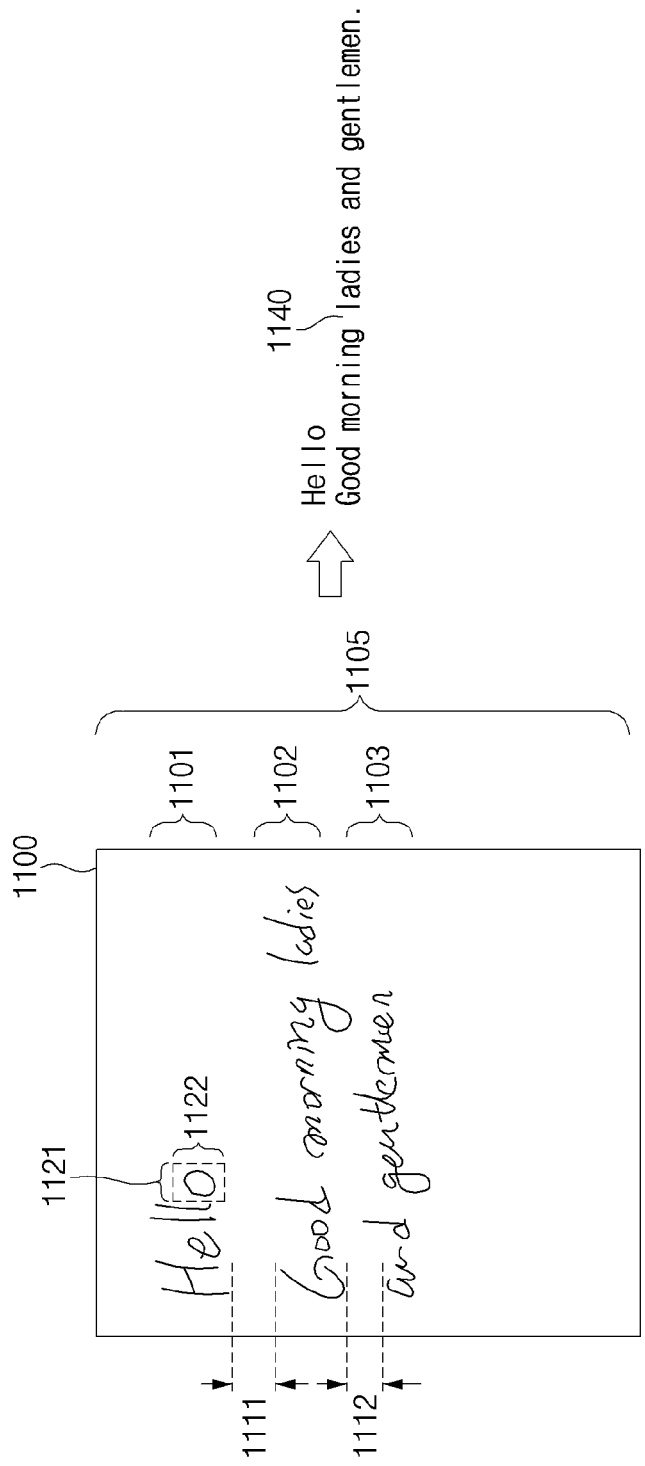
FIG. 11A illustrates an operation of converting a handwriting input into text based on a fifth condition according to an embodiment of the disclosure.

FIG. 11A illustrates an operation of converting a handwriting input into text based on a fifth condition according to an embodiment of the disclosure. In the disclosure, the fifth condition may be based on a line spacing between a plurality of handwriting inputs.

Referring to FIG. 11A, a handwriting input that is input on an input field 1100 may include a first handwriting input corresponding to a first line 1101, a second handwriting input corresponding to a second line 1102, and a third handwriting input corresponding to a third line 1103.

In one embodiment, when a line spacing 1111 between the first handwriting input and the second handwriting input exceeds a fifth threshold, the electronic device 101 may maintain the second line 1102 without merging the second line 1102 into the first line 1101. When a line spacing 1112 between the second handwriting input and the third handwriting input is less than the fifth threshold, the electronic device 101 may merge the third line 1103 into the second line 1102. In this case, the electronic device 101 may output text 1140 in which the second line 1102 and the first line 1101 are separated from each other, and the third line 1103 is merged into the second line 1102.

The fifth threshold may be determined based on a specified ratio of a height 1105 of the input field 1100. For example, the electronic device 101 may determine about ⅒ of the height 1105 of the input field 1100 as the fifth threshold.

As another example, the fifth threshold may be determined based on a specified ratio of a size of a display (e.g., the display 260 in FIG. 2). As another example, the fifth threshold may be adjusted by a user setting. As another example, the fifth threshold may be determined based on a size of a letter included in the acquired handwriting input. For example, the electronic device 101 may determine at least one of a height 1122, a width 1121, or an area of one letter (e.g., 'o') included in the acquired handwriting input, and determine a specified multiple (e.g., 1 times) of the determined value as the fifth threshold. As another example, the electronic device 101 may calculate an intermediate value for sizes of a plurality of letters included in the acquired handwriting input, and determine a specified multiple (e.g., 1 times) of the calculated intermediate value as the fifth threshold.

Figure 11B:
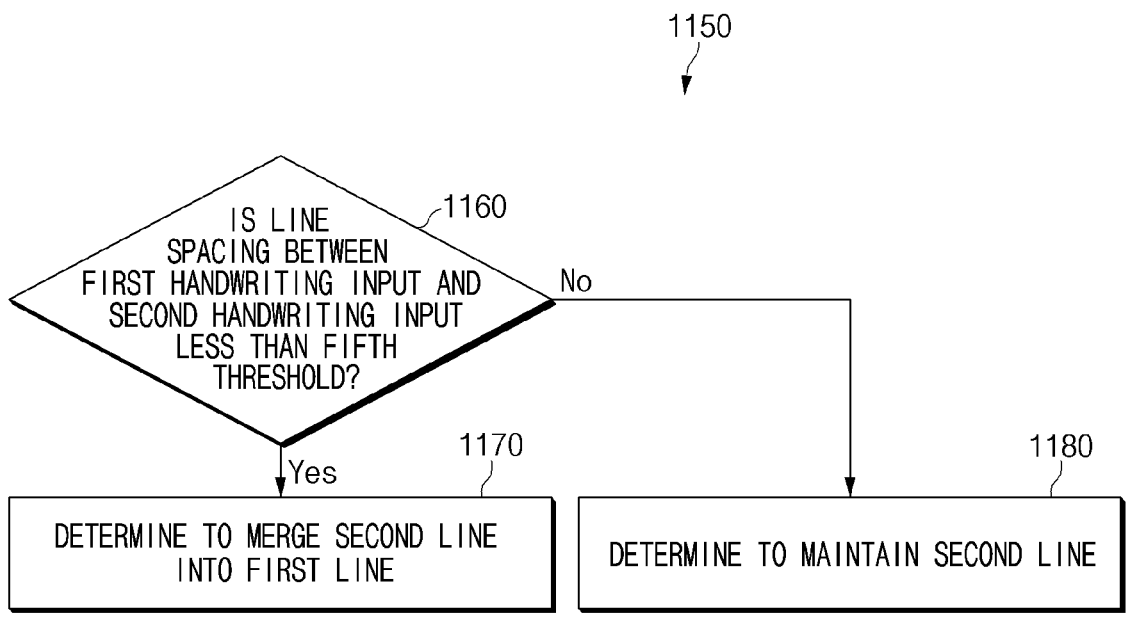
FIG. 11B illustrates an operational flowchart of an electronic device for converting a handwriting input into text based on a fifth condition according to an embodiment of the disclosure.

FIG. 11B illustrates an operational flowchart of an electronic device for converting a handwriting input into text based on a fifth condition according to an embodiment of the disclosure.

Referring to FIG. 11B, in operation 1160 of operational flowchart 1150, an electronic device 101 may determine whether a line spacing 1111 between the first handwriting input and the second handwriting input is less than the fifth threshold.

When the line spacing 1111 between the first handwriting input and the second handwriting input is less than the fifth threshold, in operation 1170, the electronic device 101 may determine to merge the second line 1102 into the first line 1101.

When the line spacing 1111 between the first handwriting input and the second handwriting input exceeds the fifth threshold, in operation 1180, the electronic device 101 may determine to maintain the second line 1102.

Figure 12A:
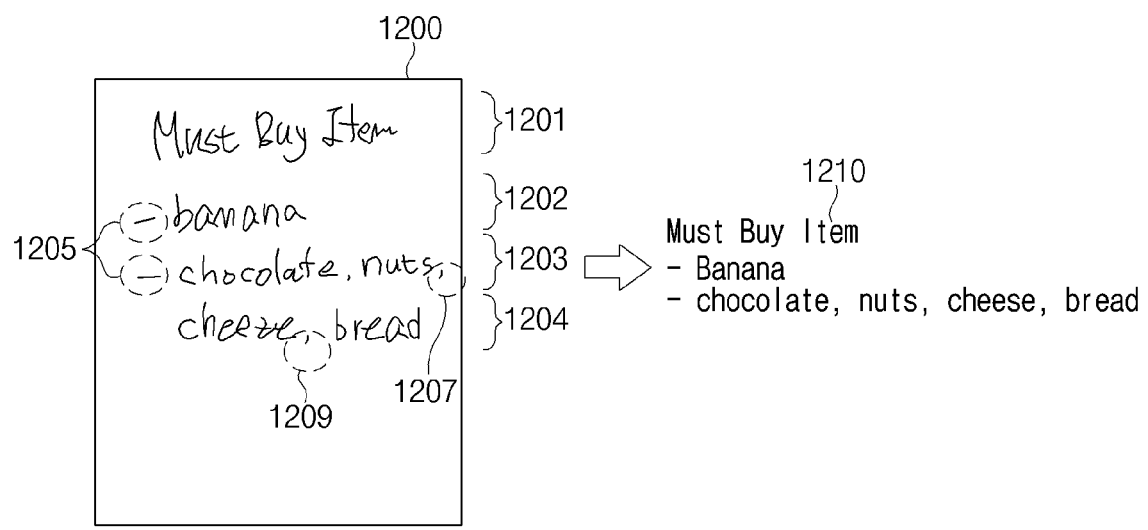
FIG. 12A illustrates an operation of converting a handwriting input into text based on a sixth condition according to an embodiment of the disclosure.
Figure 12B:
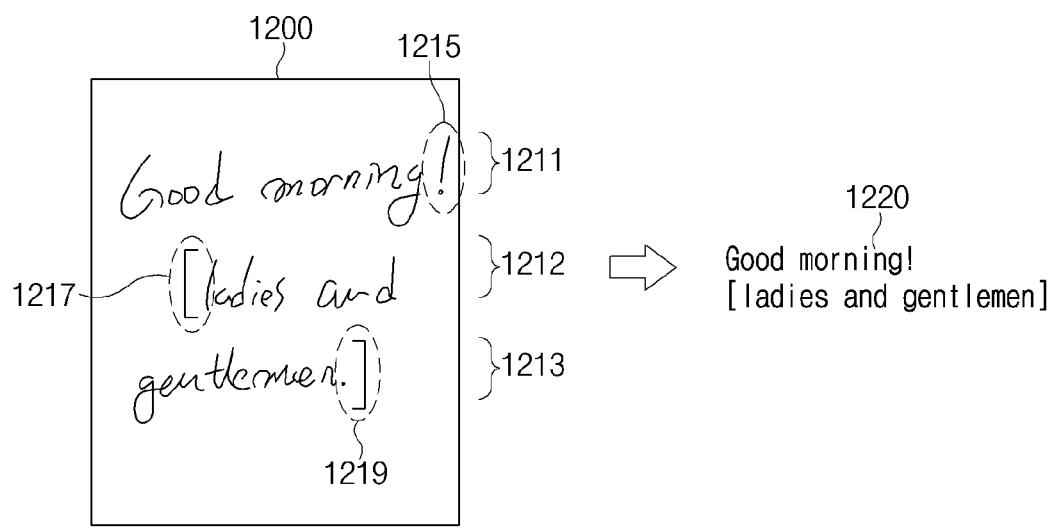
FIG. 12B illustrates another operation of converting a handwriting input into text based on a sixth condition according to an embodiment of the disclosure.
Figure 12C:
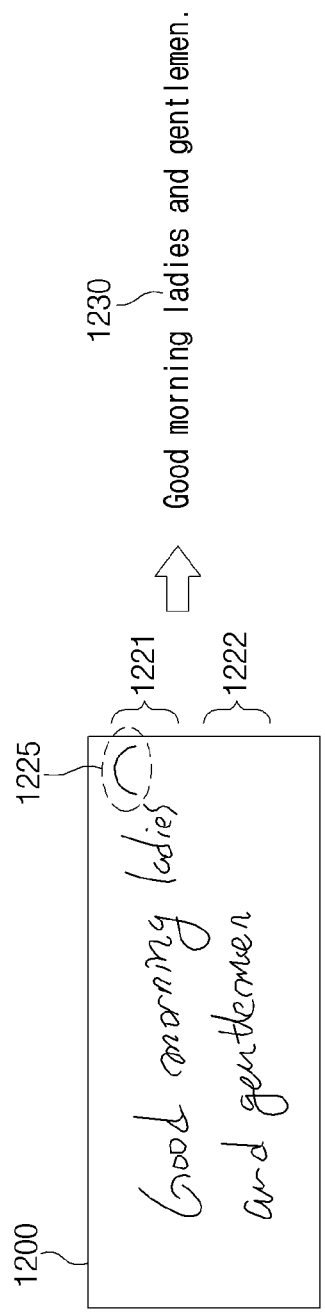
FIG. 12C illustrates another operation of converting a handwriting input into text based on a sixth condition according to an embodiment of the disclosure.

FIGS. 12A to 12C illustrate operations of converting a handwriting input into text based on a sixth condition according to various embodiments of the disclosure. In various embodiments disclosed in the disclosure, the sixth condition may be based on a symbol included in the handwriting input.

According to embodiments, the electronic device 101 may determine the merging or the maintenance of the line based on the symbols included in the acquired handwriting input. The symbols and determination conditions used to determine the merging or the maintenance of the lines may be exemplified in Table 1 below.

TABLE 1

| Symbol type | Symbol | Determination condition | Result |
|---|---|---|---|
| Terminating symbol | . ! ? | Case in which last letter in previous line is terminating symbol | Maintain (Separate) |
| Bullet point | - * 1 | Case in which first letter of current line is bullet point | Maintain (Separate) |
| Number list | 1, 2, 3 | Case in which number list is contained in plurality of lines | Maintain (Separate) |
| Match symbol | " "" ◇ ( ) { } [ ] | Case in which current line contains match terminating symbol and previous line contains match start symbol | Merge |
| Connective | , | Case in which current line contains connective and previous line also contains connective | Merge |

Table 1 illustrates only a case in which the bullet point is the first letter of the line. However, according to another embodiment, when lines in which the first letter is the bullet point are continuous, the lines containing the bullet points may be separated from each other. For example, some (e.g., '-') of the bullet points may be used for other purposes (e.g., for connecting a word with a word), so that the electronic device 101 may accurately reflect an intention of the user compared to the case in which the bullet point is written as the first letter in only one line by separating the lines only when the lines in which the first letter is the bullet point are continuous.

For example, referring to FIG. 12A, a handwriting input that is input on an input field 1200 may include a first handwriting input (e.g., 'Must Buy Item') corresponding to a first line 1201, a second handwriting input (e.g., '-banana') corresponding to a second line 1202, a third handwriting input (e.g., '-chocolate, nuts,') corresponding to a third line 1203, and a fourth handwriting input (e.g., 'cheese, bread') corresponding to a fourth line 1204. Because a symbol 1205 indicating the bullet point is included in the second line 1202 and the third line 1203, the electronic device 101 may maintain the first line 1201, the second line 1202, and the third line 1203 without merging them. In addition, because a symbol 1209 indicating the connective is included in the fourth line 1204 and a symbol 1207 indicating the connective is included in the third line 1203, the electronic device 101 may merge the fourth line 1204 into the third line 1203. The electronic device 101 may output text 1210 corresponding to a handwriting input in which the merging or the maintenance of the line is determined.

Referring to FIG. 12B, as another example, a handwriting input that is input on the input field 1200 may include a first handwriting input (e.g., 'Good morning!') corresponding to a first line 1211, a second handwriting input (e.g., '[ladies and') corresponding to a second line 1212, and a third handwriting input (e.g., 'gentlemen]') corresponding to a third line 1213. Because the last letter of the first line 1211 contains a symbol 1215 indicating the terminating symbol, the electronic device 101 may maintain the second line 1212 without merging the second line 1212 into the first line 1211. In addition, because a symbol 1219 indicating the match terminating symbol is included in the third line 1213 and a symbol 1217 indicating the match start symbol is included in the second line 1212, the electronic device 101 may merge the third line 1213 into the second line 1212. The electronic device 101 may output text 1220 corresponding to a handwriting input in which the merging or the maintenance of the line is determined.

According to another embodiment, the electronic device 101 may determine to merge or maintain the line based on a symbol set by the user. For example, referring to FIG. 12C, a handwriting input that is input on the input field 1200 may include a first handwriting input (e.g., 'Good morning ladies') corresponding to a first line 1221 and a second handwriting input (e.g., 'and gentlemen') corresponding to a second line 1222. When a symbol 1225 set by the user is included at a location adjacent to an end point of the first line 1221, the electronic device 101 may merge the second line 1222 into the first line 1221. The electronic device 101 may output text 1230 corresponding to a handwriting input in which the merging or the maintenance of the line is determined.

In this case, the electronic device 101 may control the symbol 1225 set by the user not to be included in the converted text 1230.

Figure 13:
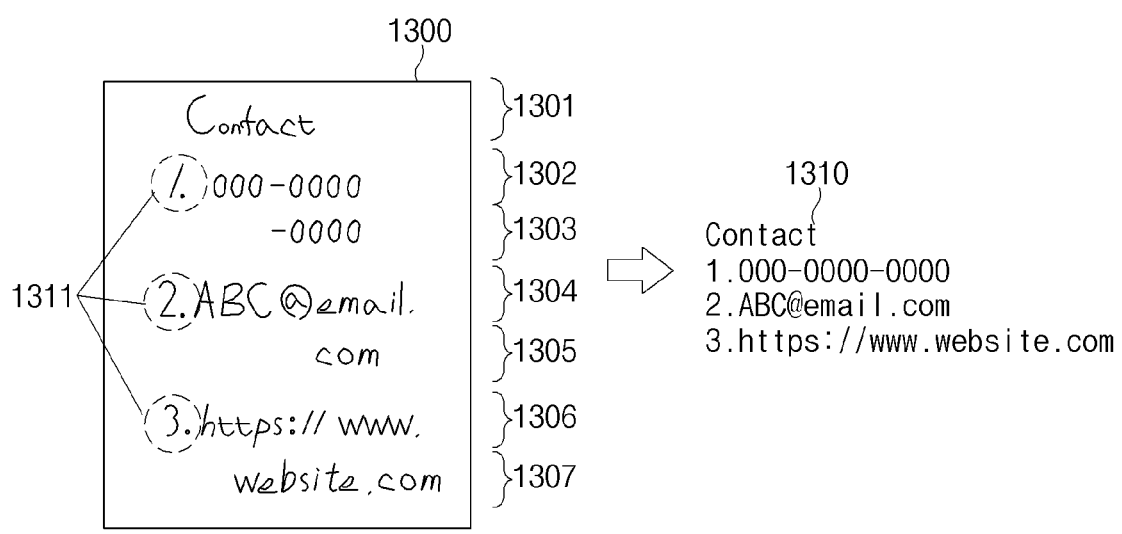
FIG. 13 illustrates an operation of converting a handwriting input into text based on a seventh condition according to an embodiment of the disclosure The same reference numerals may be used to represent the same elements throughout the drawings.

FIG. 13 illustrates an operation of converting a handwriting input into text based on a seventh condition according to an embodiment of the disclosure. In the disclosure, the seventh condition may be based on a specified pattern included in a handwriting input. The specified pattern may include, for example, a phone number, a URL, or an e-mail address.

Referring to FIG. 13, a handwriting input that is input on an input field 1300 may include a first handwriting input (e.g., 'Contact') corresponding to a first line 1301, a second handwriting input (e.g., '1. 000-0000') corresponding to a second line 1302, a third handwriting input (e.g., '-0000') corresponding to a third line 1303, a fourth handwriting input (e.g., '2. ABC@email.') corresponding to a fourth line 1304, a fifth handwriting input (e.g., 'com') corresponding to a fifth line 1305, a sixth handwriting input (e.g., 'https://www.') corresponding to a sixth line 1306, and a seventh handwriting input (e.g., 'website.com') corresponding to a seventh line 1307. The electronic device 101 according to the embodiments may determine the merging or the maintenance of the line based on whether the handwriting inputs represent the specified pattern.

For example, because symbols 1311 indicating the number list are included in the second line 1302, the fourth line 1304, and the sixth line 1306, the electronic device 101 may maintain the first line 1301, the second line 1302, the fourth line 1304, and the sixth line 1306 without merging them. When a pattern of letters indicated by the second handwriting input and the third handwriting input is the same as a pattern of the phone number, the electronic device 101 may merge the third line 1303 into the second line 1302. When a pattern of letters indicated by the fourth handwriting input and the fifth handwriting input is the same as a pattern of the e-mail address, the electronic device 101 may merge the fifth line 1305 into the fourth line 1304. When a pattern of letters indicated by the sixth handwriting input and the seventh handwriting input is the same as a pattern of the URL, the electronic device 101 may merge the seventh line 1307 into the sixth line 1306. The electronic device 101 may output text 1310 corresponding to a handwriting input in which the merging or the maintenance of the line is applied.

As described above, an electronic device (e.g., 101 in FIG. 1) according to an embodiment includes a display (e.g., at least a portion of the display module 160 in FIG. 1) including a sensing panel that senses a handwriting input, at least one processor (e.g., the processor 120 in FIG. 1) operatively connected to the display, and memory (e.g., the memory 130 in FIG. 1) storing instructions which, when executed by the at least one processor, cause the electronic device to acquire the handwriting input (e.g., the handwriting input 300 in FIG. 3) through the display, wherein the handwriting input includes a first handwriting input corresponding to a first line and a second handwriting input corresponding to a second line, determine whether to merge the second line into the first line or to maintain the second line based on whether at least one of the first handwriting input or the second handwriting input satisfies a specified condition, convert the handwriting input where the merging or the maintenance of the second line is applied into text (e.g., the first text 310 or the second text 320 in FIG. 3), and display the converted handwriting input as text through the display.

According to an embodiment, the instructions may cause the electronic device to shade text corresponding to the second handwriting input, output the text corresponding to the second handwriting input in a color different from a color of text corresponding to the first handwriting input, or output an indicator indicating that the second line is merged through the display when the second line is merged into the first line.

According to an embodiment, the instructions may cause the electronic device to determine to merge the second line into the first line when a width (e.g., the width 620 in FIG. 6A) of a region occupied by the first handwriting input in an input field (e.g., the input field 600 in FIG. 6A) is equal to or greater than a first threshold, and determine to maintain the second line when the width of the region occupied by the first handwriting input in the input field is less than the first threshold.

According to an embodiment, the instructions may cause the electronic device to, when the width of the region occupied by the first handwriting input in the input field is equal to or greater than the first threshold, determine to merge the second line into the first line when a distance (e.g., the distance 725 in FIG. 7A) between an end point of the first handwriting input and an end point of the input field is less than a second threshold or when the end point of the first handwriting input is located within a first region (e.g., the first region 710 in FIG. 7A) adjacent to the end point of the input field, and determine to maintain the second line when the distance between the end point of the first handwriting input and the end point of the input field exceeds the second threshold or when the end point of the first handwriting input is not located within the first region.

According to an embodiment, the instructions may cause the electronic device to, when the width of the region occupied by the first handwriting input in the input field is equal to or greater than the first threshold, determine to merge the second line into the first line when a distance (e.g., the distance 825 in FIG. 8A) between a start point of the second handwriting input and a start point of the input field is less than a second threshold or when the start point of the second handwriting input is located within a second region (e.g., the second region 810 in FIG. 8A) adjacent to the start point of the input field, and determine to maintain the second line when the distance between the start point of the second handwriting input and the start point of the input field exceeds the second threshold or when the start point of the second handwriting input is located within the second region.

According to an embodiment, the instructions may cause the electronic device to determine a width of the first region or the second region based on a specified ratio of a width of the input field or based on a user input of moving the first region or the second region in a specified direction.

According to an embodiment, the instructions may cause the electronic device to, when the width of the region occupied by the first handwriting input in the input field is equal to or greater than the first threshold, determine to merge the second line into the first line when a distance (e.g., the distance 1020 in FIG. 10A) between a start point of the first handwriting input and a start point of the second handwriting input is less than a fourth threshold, and determine to maintain the second line when the distance between the start point of the first handwriting input and the start point of the second handwriting input exceeds the fourth threshold.

According to an embodiment, the instructions may cause the electronic device to determine to merge the second line into the first line when a line spacing (e.g., the line spacing 1111 or the line spacing 1112 in FIG. 11A) between the first handwriting input and the second handwriting input is less than a fifth threshold, and determine to maintain the second line when the line spacing between the first handwriting input and the second handwriting input exceeds the fifth threshold.

According to an embodiment, the instructions may cause the electronic device to determine whether to merge the second line into the first line or to maintain the second line based on whether a symbol indicating at least one of a terminating symbol, a bullet point, a number list, a match symbol, or a connective is included in at least one of the first handwriting input or the second handwriting input.

According to an embodiment, the instructions may cause the electronic device to determine to merge the second line into the first line when the first handwriting input and the second handwriting input represent a specified pattern.

As described above, a method of an electronic device (e.g., the electronic device 101 in FIG. 1) includes acquiring a handwriting input including a first handwriting input corresponding to a first line and a second handwriting input corresponding to a second line, determining whether to merge the second line into the first line or to maintain the second line based on whether at least one of the first handwriting input or the second handwriting input satisfies a specified condition, converting the handwriting input where the merging or the maintenance of the second line is applied into text (e.g., the first text 310 or the second text 320 in FIG. 3), and outputting the converted handwriting input as text.

According to an embodiment, the method may further include shading text corresponding to the second handwriting input, outputting the text corresponding to the second handwriting input in a color different from a color of text corresponding to the first handwriting input, or outputting an indicator indicating that the second line is merged when the second line is merged into the first line.

According to an embodiment, the determining of whether to merge the second line into the first line or to maintain the second line may include determining to merge the second line into the first line when a width (e.g., the width 620 in FIG. 6A) of a region occupied by the first handwriting input in an input field (e.g., the input field 600 in FIG. 6A) is equal to or greater than a first threshold, and determining to maintain the second line when the width of the region occupied by the first handwriting input in the input field is less than the first threshold.

According to an embodiment, the determining of whether to merge the second line into the first line or to maintain the second line may include, when the width of the region occupied by the first handwriting input in the input field is equal to or greater than the first threshold, determining to merge the second line into the first line when a distance (e.g., the distance 725 in FIG. 7A) between an end point of the first handwriting input and an end point of the input field is less than a second threshold or when the end point of the first handwriting input is located within a first region (e.g., the first region 710 in FIG. 7A) adjacent to the end point of the input field, and determining to maintain the second line when the distance between the end point of the first handwriting input and the end point of the input field exceeds the second threshold or when the end point of the first handwriting input is not located within the first region.

According to an embodiment, the determining of whether to merge the second line into the first line or to maintain the second line may include, when the width of the region occupied by the first handwriting input in the input field is equal to or greater than the first threshold, determining to merge the second line into the first line when a distance (e.g., the distance 825 in FIG. 8A) between a start point of the second handwriting input and a start point of the input field is less than a second threshold or when the start point of the second handwriting input is located within a second region (e.g., the second region 810 in FIG. 8A) adjacent to the start point of the input field, and determining to maintain the second line when the distance between the start point of the second handwriting input and the start point of the input field exceeds the second threshold or when the start point of the second handwriting input is not located within the second region.

According to an embodiment, the method may further include determining a width of the first region or the second region based on a specified ratio of a width of the input field or based on a user input of moving the first region or the second region in a specified direction.

According to an embodiment, the determining of whether to merge the second line into the first line or to maintain the second line may include, when the width of the region occupied by the first handwriting input in the input field is equal to or greater than the first threshold, determining to merge the second line into the first line when a distance (e.g., the distance 1020 in FIG. 10A) between a start point of the first handwriting input and a start point of the second handwriting input is less than a fourth threshold, and determining to maintain the second line when the distance between the start point of the first handwriting input and the start point of the second handwriting input exceeds the fourth threshold.

According to an embodiment, the determining of whether to merge the second line into the first line or to maintain the second line may include determining to merge the second line into the first line when a line spacing (e.g., the line spacing 1111 or the line spacing 1112 in FIG. 11A) between the first handwriting input and the second handwriting input is less than a fifth threshold, and determining to maintain the second line when the line spacing between the first handwriting input and the second handwriting input exceeds the fifth threshold.

According to an embodiment, the determining of whether to merge the second line into the first line or to maintain the second line may include determining whether to merge the second line into the first line or to maintain the second line based on whether a symbol indicating at least one of a terminating symbol, a bullet point, a number list, a match symbol, or a connective is included in at least one of the first handwriting input or the second handwriting input.

According to an embodiment, the determining of whether to merge the second line into the first line or to maintain the second line may include determining to merge the second line into the first line when the first handwriting input and the second handwriting input represent a specified pattern.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120 in FIG. 1) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to embodiments disclosed in the disclosure, the electronic device may increase the utilization of the handwriting function by reflecting the intention of the user for the handwriting input.

According to embodiments disclosed in the disclosure, the electronic device may increase a degree of freedom for a memo scheme of the user and provide a user-friendly environment.

In addition, various effects that are directly or indirectly identified through the disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a display comprising a sensing panel configured to sense a handwriting input;
at least one processor; and
memory storing one or more computer programs including computer-executable instructions which, when executed by the at least one processor, cause the electronic device to:
acquire the handwriting input sensed by the sensing panel and displayed on the display, the handwriting input comprising a first handwriting input corresponding to a first line and a second handwriting input corresponding to a second line,
based on the acquiring of the handwriting input, determine whether a width of a region occupied by the first handwriting input in an input field displayed on the display is greater than or equal to a specified ratio of a width of the input field,
based on a result of determining whether at least one of the first handwriting input or the second handwriting input satisfies at least one specified condition including a condition in which the width of the first handwriting input corresponding to the first line is greater than or equal to the specified ratio of the width of the input field, determine to either merge the second line into the first line or maintain the second line,
based on a result of the determining to either merge the second line into the first line or maintain the second line, convert the handwriting input into text by either merging the second line into the first line or maintaining the second line, and
control the display to display the converted handwriting input.

2. The electronic device of claim 1, wherein the one or more computer programs further include computer-executable instructions which, when executed by the at least one processor, cause the electronic device to:
based on the second line being merged into the first line, control the display to shade text corresponding to the second handwriting input, output the text corresponding to the second handwriting input in a color different from a color of text corresponding to the first handwriting input, or output an indicator indicating that the second line is merged.

3. The electronic device of claim 1, wherein the one or more computer programs further include computer-executable instructions which, when executed by the at least one processor, cause the electronic device to:
in response to the width of the region occupied by the first handwriting input in the input field being equal to or greater than a first threshold, determine to merge the second line into the first line, and
in response to the width of the region occupied by the first handwriting input in the input field being less than the first threshold, determine to maintain the second line.

4. The electronic device of claim 3, wherein, in case the width of the region occupied by the first handwriting input in the input field is equal to or greater than the first threshold, the one or more computer programs further include computer-executable instructions which, when executed by the at least one processor, cause the electronic device to at least one of:
in response to a distance between an end point of the first handwriting input and an end point of the input field being less than a second threshold, determine to merge the second line into the first line,
in response to the end point of the first handwriting input being located within a first region adjacent to the end point of the input field, determine to merge the second line into the first line,
in response to the distance between the end point of the first handwriting input and the end point of the input field being greater than the second threshold, determine to maintain the second line, or
in response to the end point of the first handwriting input not being located within the first region, determine to maintain the second line.

5. The electronic device of claim 4, wherein the one or more computer programs further include computer-executable instructions which, when executed by the at least one processor, cause the electronic device to:
determine a width of the first region or a width of a second region adjacent to a start point of the input field based on one of the specified ratio of the width of the input field or a user input of moving the first region or the second region in a specified direction.

6. The electronic device of claim 3, wherein, in case the width of the region occupied by the first handwriting input in the input field is equal to or greater than the first threshold, the one or more computer programs further include computer-executable instructions which, when executed by the at least one processor, cause the electronic device to at least one of:
in response to a distance between a start point of the second handwriting input and a start point of the input field being less than a third threshold, determine to merge the second line into the first line,
in response to the start point of the second handwriting input being located within a second region adjacent to the start point of the input field, determine to merge the second line into the first line,
in response to the distance between the start point of the second handwriting input and the start point of the input field exceeding the third threshold, determine to maintain the second line, or
in response to the start point of the second handwriting input not being located within the second region, determine to maintain the second line.

7. The electronic device of claim 3, wherein, in case the width of the region occupied by the first handwriting input in the input field is equal to or greater than the first threshold, the one or more computer programs further include computer-executable instructions which, when executed by the at least one processor, cause the electronic device to:
in response to a distance between a start point of the first handwriting input and a start point of the second handwriting input being less than a fourth threshold, determine to merge the second line into the first line, and in response to the distance between the start point of the first handwriting input and the start point of the second handwriting input exceeding the fourth threshold, determine to maintain the second line.

8. The electronic device of claim 1, wherein the one or more computer programs further include computer-executable instructions which, when executed by the at least one processor, cause the electronic device to:
in response to a line spacing between the first handwriting input and the second handwriting input being less than a fifth threshold, determine to merge the second line into the first line, and
in response to the line spacing between the first handwriting input and the second handwriting input exceeding the fifth threshold, determine to maintain the second line.

9. The electronic device of claim 1, wherein the one or more computer programs further include computer-executable instructions which, when executed by the at least one processor, cause the electronic device to:
based on whether a symbol indicating at least one of a terminating symbol, a bullet point, a number list, a match symbol, or a connective is included in at least one of the first handwriting input or the second handwriting input, determine to merge the second line into the first line or maintain the second line.

10. The electronic device of claim 1, wherein the one or more computer programs further include computer-executable instructions which, when executed by the at least one processor, cause the electronic device to:
in response to the first handwriting input and the second handwriting input representing a specified pattern, determine to merge the second line into the first line.

11. A method of an electronic device, the method comprising:
acquiring, by the electronic device, a handwriting input, the handwriting input comprising a first handwriting input corresponding to a first line and a second handwriting input corresponding to a second line;
based on the acquiring of the handwriting input, determining, by the electronic device, whether a width of a region occupied by the first handwriting input in an input field displayed on a display of the electronic device is greater than or equal to a specified ratio of a width of the input field;
based on a result of determining whether at least one of the first handwriting input or the second handwriting input satisfies at least one specified condition including a condition in which the width of the first handwriting input corresponding to the first line is greater than or equal to the specified ratio of the width of the input field, determining, by the electronic device, to either merge the second line into the first line or maintain the second line;
based on a result of the determining to either merge the second line into the first line or maintain the second line, converting, by the electronic device, the handwriting input into text by either merging the second line into the first line to create a single sentence or maintaining the second line to create a first sentence corresponding to the first line and a second sentence corresponding to the second line; and
outputting, by the electronic device, the converted handwriting input.

12. The method of claim 11, further comprising:
based on the second line being merged into the first line, shading, by the electronic device, text corresponding to the second handwriting input, outputting, by the electronic device, the text corresponding to the second handwriting input in a color different from a color of text corresponding to the first handwriting input, or outputting, by the electronic device, an indicator indicating that the second line is merged.

13. The method of claim 11, further comprising:
in response to the width of the region occupied by the first handwriting input in the input field being equal to or greater than a first threshold, determining, by the electronic device, to merge the second line into the first line; and
in response to the width of the region occupied by the first handwriting input in the input field being less than the first threshold, determining, by the electronic device, to maintain the second line.

14. The method of claim 13, wherein, based on the width of the region occupied by the first handwriting input in the input field being equal to or greater than the first threshold, the method further comprises at least one of:
in response to a distance between an end point of the first handwriting input and an end point of the input field being less than a second threshold, determining, by the electronic device, to merge the second line into the first line;
in response to the end point of the first handwriting input being located within a first region adjacent to the end point of the input field, determining, by the electronic device, to merge the second line into the first line;
in response to the distance between the end point of the first handwriting input and the end point of the input field exceeding the second threshold, determining, by the electronic device, to maintain the second line; or
in response to the end point of the first handwriting input not being located within the first region, determining, by the electronic device, to maintain the second line.

15. The method of claim 14, further comprising:
determining, by the electronic device, a width of the first region or a width of a second region adjacent to a start point of the input field based on one of the specified ratio of the width of the input field or a user input of moving the first region or the second region in a specified direction.

16. The method of claim 13, wherein, based on the width of the region occupied by the first handwriting input in the input field being equal to or greater than the first threshold, the method further comprises at least one of:
in response to a distance between a start point of the second handwriting input and a start point of the input field being less than a third threshold, determining, by the electronic device, to merge the second line into the first line;
in response to the start point of the second handwriting input being located within a second region adjacent to the start point of the input field, determining by the electronic device, to merge the second line into the first line;
in response to the distance between the start point of the second handwriting input and the start point of the input field exceeding the third threshold, determining, by the electronic device, to maintain the second line; or
in response to the start point of the second handwriting input not being located within the second region, determining, by the electronic device, to maintain the second line.

17. The method of claim 13, wherein, based on the width of the region occupied by the first handwriting input in the input field being equal to or greater than the first threshold, the method further comprises:
  in response to a distance between a start point of the first handwriting input and a start point of the second handwriting input being less than a fourth threshold, determining, by the electronic device, to merge the second line into the first line; and
  in response to the distance between the start point of the first handwriting input and the start point of the second handwriting input exceeding the fourth threshold, determining, by the electronic device, to maintain the second line.

18. The method of claim 11, further comprising:
  in response to a line spacing between the first handwriting input and the second handwriting input being less than a fifth threshold, determining, by the electronic device, to merge the second line into the first line; and
  in response to the line spacing between the first handwriting input and the second handwriting input exceeding the fifth threshold, determining, by the electronic device, to maintain the second line.

19. The method of claim 11, further comprising:
  based on whether a symbol indicating at least one of a terminating symbol, a bullet point, a number list, a match symbol, or a connective is included in at least one of the first handwriting input or the second handwriting input, determining, by the electronic device, to merge the second line into the first line or maintain the second line.

20. The method of claim 11, further comprising:
  in response to the first handwriting input and the second handwriting input representing a specified pattern, determining, by the electronic device, to merge the second line into the first line.

* * * * *